US012431627B2

(12) United States Patent
Bates

(10) Patent No.: US 12,431,627 B2
(45) Date of Patent: Sep. 30, 2025

(54) MILLIMETER WAVE FILTER ARRAY

(71) Applicant: Knowles Cazenovia, Inc., Cazenovia, NY (US)

(72) Inventor: David Bates, Cazenovia, NY (US)

(73) Assignee: KNOWLES CAZENOVIA, INC., Cazenovia, NY (US)

( * ) Notice: Subject to any disclaimer, the term of this patent is extended or adjusted under 35 U.S.C. 154(b) by 997 days.

(21) Appl. No.: 16/510,786

(22) Filed: Jul. 12, 2019

(65) Prior Publication Data

US 2020/0021004 A1 Jan. 16, 2020

Related U.S. Application Data

(60) Provisional application No. 62/697,558, filed on Jul. 13, 2018.

(51) Int. Cl.
*H01Q 9/04* (2006.01)
*H01P 1/208* (2006.01)
(Continued)

(52) U.S. Cl.
CPC ......... *H01Q 9/0485* (2013.01); *H01P 1/2084* (2013.01); *H01P 1/2088* (2013.01);
(Continued)

(58) Field of Classification Search
CPC .... H01P 1/2088; H01P 1/2084; H01P 11/007; H01P 11/008; H01P 11/006; H01Q 1/523;
(Continued)

(56) References Cited

U.S. PATENT DOCUMENTS 8,076,162 B2 12/2011 Flemming et al.
8,096,147 B2 1/2012 Flemming et al.
(Continued)

FOREIGN PATENT DOCUMENTS

WO WO-2021/183440 A1 9/2021
WO WO-2021/211855 A1 10/2021

OTHER PUBLICATIONS

Awida et al., "A 2×4 Substrate-Integrated Waveguide Probe-Fed Cavity-Backed Patch Array," IEEE Antennas and Propagation Int'l Symposium, 4 pages (Jul. 11, 2010).
(Continued)

*Primary Examiner* — Jeffrey T Carley
*Assistant Examiner* — Joshua D Anderson
(74) *Attorney, Agent, or Firm* — FOLEY & LARDNER LLP

(57) ABSTRACT

Methods, systems, and apparatuses, for a millimeter wave filter array are discussed. The filter array includes an array of unit cells formed using a dielectric layer of a dielectric material, the dielectric layer having a first surface and an opposing second surface. Each unit cell includes conductive sidewall layers extending at least partially between the first surface and the second surface of the dielectric layer and defining a resonant space within the dielectric layer. Each unit cell also includes a metallized layer formed on the first surface, covering at least a portion of the resonant space of the dielectric layer and electrically connected to the conductive sidewall layers. Each unit cell includes a radio-frequency input-output (RF I/O) contact formed on the first surface of the dielectric layer.

19 Claims, 13 Drawing Sheets

(51) Int. Cl.
*H01P 11/00* (2006.01)
*H01Q 13/18* (2006.01)
*H01Q 13/28* (2006.01)
*H01Q 15/00* (2006.01)

(52) U.S. Cl.
CPC .......... *H01P 11/007* (2013.01); *H01P 11/008* (2013.01); *H01Q 13/18* (2013.01); *H01Q 13/28* (2013.01); *H01Q 15/0053* (2013.01)

(58) Field of Classification Search
CPC ...... H01Q 9/0485; H01Q 13/18; H01Q 13/28; H01Q 15/0053; H01Q 21/065; H01Q 21/0087; H01Q 21/0093; H01Q 23/00; Y10T 29/49005; Y10T 29/49016; Y10T 29/4908; H05K 3/002; H05K 3/0023; H05K 3/0026; H05K 3/0029
See application file for complete search history.

(56) References Cited

U.S. PATENT DOCUMENTS

| | | | | |
|---|---|---|---|---|
| 8,361,333 | B2 | 1/2013 | Flemming et al. | |
| 8,492,315 | B2 | 7/2013 | Flemming et al. | |
| 8,709,702 | B2 | 4/2014 | Flemming et al. | |
| 8,860,532 | B2 | 10/2014 | Gong et al. | |
| 10,070,533 | B2 | 9/2018 | Flemming et al. | |
| 10,201,091 | B2 | 2/2019 | Flemming et al. | |
| 10,665,377 | B2 | 5/2020 | Flemming et al. | |
| 10,854,946 | B2 | 12/2020 | Flemming et al. | |
| 10,903,545 | B2 | 1/2021 | Popovich et al. | |
| 11,076,489 | B2 | 7/2021 | Flemming et al. | |
| 11,101,532 | B2 | 8/2021 | Bullington et al. | |
| 11,139,582 | B2 | 10/2021 | Flemming et al. | |
| 11,161,773 | B2 | 11/2021 | Flemming et al. | |
| 11,264,167 | B2 | 3/2022 | Flemming et al. | |
| 11,270,843 | B2 | 3/2022 | Flemming | |
| 11,342,896 | B2 | 5/2022 | Flemming et al. | |
| 2003/0067410 | A1 | 4/2003 | Puzella et al. | |
| 2006/0092079 | A1* | 5/2006 | de Rochemont .. | H01Q 21/0025 343/895 |
| 2008/0018391 | A1 | 1/2008 | Bates | |
| 2008/0197946 | A1 | 8/2008 | Houck et al. | |
| 2008/0211601 | A1 | 9/2008 | Bates | |
| 2009/0231064 | A1 | 9/2009 | Bates et al. | |
| 2012/0007786 | A1 | 1/2012 | Ando et al. | |
| 2013/0342287 | A1 | 12/2013 | Randall et al. | |
| 2015/0349398 | A1* | 12/2015 | Uemichi .............. | H05K 1/0251 29/600 |
| 2018/0183130 | A1 | 6/2018 | Bates | |
| 2019/0081378 | A1 | 3/2019 | Bates | |
| 2019/0093233 | A1 | 3/2019 | Flemming et al. | |
| 2019/0103682 | A1 | 4/2019 | Thai et al. | |
| 2019/0177213 | A1 | 6/2019 | Flemming et al. | |
| 2019/0334228 | A1 | 10/2019 | Haridas et al. | |
| 2020/0021030 | A1 | 1/2020 | Bates | |
| 2020/0036103 | A1 | 1/2020 | Ariumi | |
| 2020/0212864 | A1 | 7/2020 | Flemming et al. | |
| 2020/0243248 | A1 | 7/2020 | Flemming et al. | |
| 2020/0259263 | A1 | 8/2020 | Dani | |
| 2020/0358160 | A1 | 11/2020 | Alton | |
| 2020/0382089 | A1 | 12/2020 | Flemming et al. | |
| 2020/0403286 | A1 | 12/2020 | Burdick | |
| 2021/0005949 | A1 | 1/2021 | Flemming et al. | |
| 2021/0175136 | A1 | 6/2021 | Flemming et al. | |
| 2021/0313417 | A1 | 10/2021 | Flemming et al. | |
| 2022/0093465 | A1 | 3/2022 | Popovich et al. | |
| 2022/0173488 | A1 | 6/2022 | Flemming et al. | |

OTHER PUBLICATIONS

Bayderkhani et al., "Gain-Enhanced SIW Cavity-Backed Slot Antenna With Arbitrary Levels of Inclined Polarization," IEEE Antennas and Wireless Propagation Letters, vol. 14, pp. 931-934(Dec. 31, 2014).

Cheng et al., "Vertically Integrated Three-Pole Filter/Antennas for Array Applications," IEEE Antennas and Wireless Propagation Letters, vol. 10, pp. 278-281 (Apr. 5, 2011).

Gottman et al., "Selective Laser-Induced Etching of 3D Precision Quartz Glass Components for Microfluidic Applications-Up-Scaling of Complexity and Speed," Micromachines, vol. 8, No. 4, p. 110 (Apr. 1, 2017).

Horstmann-Jungemann et al., 3D-Microstructing of Sapphire Using fs-Laser Irradiation and Selective Etching, Journal of Laser Micro/Nanoengineering, vol. 5, No. 2, pp. 145-149 (Apr. 13, 2010).

International Search Report and Written Opinion, PCT/US2019/041652 (Oct. 18, 2019).

International Search Report and Written Opinion, PCT/US2019/041686 (Oct. 18, 2019).

Li et al., "Vertical Integration of High-Q Filter With Circularly Polarized Patch Antenna With Enhanced Impedance-Axial Ratio Bandwidth," IEEE Transactions on Microwave Theory and Techniques, vol. 66, No. 5, pp. 3119-3128 (May 17, 2018).

Uemichi et al., "An Ultra Low-Loss Silica-Based Transformer Between Microstrip Line and Post-Wall Waveguide for Millimeter-Wave Antenna-in-Package Applications," IEEE Int'l Microwave Symposium, 3 pages (Jun. 6, 2014).

U.S. Appl. No. 16/699,187, filed Nov. 29, 2019, Nadeau, Pierre.

U.S. Appl. No. 17/013,504, filed Sep. 4, 2020, Burdick, Jared.

* cited by examiner (contd. on next page)

(contd.)

MILLIMETER WAVE FILTER ARRAY

CROSS REFERENCE TO RELATED APPLICATIONS

This application claims priority to U.S. Provisional Application No. 62/697,558, filed Jul. 13, 2018, entitled "Millimeter Wave Filter Array," the subject matter of which is incorporated herein by reference in its entirety.

TECHNICAL FIELD

This disclosure generally relates to radio frequency devices and in particular to millimeter wave or microwave filters, including but not limited to systems and methods for implementing devices comprising a millimeter wave or microwave filter array.

BACKGROUND

Millimeter-wave or microwave phased array transmitters and/or receivers can be used in high frequency cellular communications. For example, the phased array transmitters and/or receivers can be used in base stations of cellular communication networks to communicate with one or more cellular phones, or with another base station. In active phased array antenna applications for instance, it is challenging to implement electronic components in a transmit (or receive) function associated with each antenna element, that are small enough to fit within a unit element area or footprint of the antenna element. Moreover, microwave and millimeter wave filters are typically designed and fabricated as discrete components that lack uniformity in physical and/or electrical precision between these discrete components, and feature relatively high insertion loss that is significantly above 1 dB.

SUMMARY

In one aspect, the present disclosure is directed to a radio frequency device. The radio frequency device includes a first dielectric layer of a dielectric material, the first dielectric layer having a first surface and a second surface opposing the first surface, the first dielectric layer having a first plurality of cavities, each of the first plurality of cavities extending between the first surface and the second surface. The radio frequency device further includes a first filter unit cell formed at least partially in the first dielectric layer, the first filter unit cell including a first plurality of sidewalls of the first plurality of cavities. The unit cell further includes first conductive sidewall layers formed on at least portions of the first plurality of sidewalls, the first conductive sidewall layers defining a first resonant space comprising some of the dielectric material. The unit cell also includes a first conductive layer formed on the first surface, covering at least a portion of the first resonant space and electrically connected to the first conductive sidewall layers. The unit cell further includes a first radio-frequency input-output (RF I/O) contact formed on the first surface, the first RF I/O contact electrically isolated from the first conductive layer by a first isolation region formed around at least a portion of a perimeter of the first RF I/O contact.

In another aspect, the present disclosure is directed to a method for forming a radio frequency device. The method includes providing a first optically transparent dielectric layer having a first surface and a second surface opposing the first surface. The method further includes irradiating, using a laser, a first three dimensional structure in the first optically transparent dielectric layer, the first three dimensional structure including a first plurality of sidewall regions extending at least partially between the first surface and the second surface of the first optically transparent dielectric layer. The method also includes etching the first three dimensional structure to form a first three dimensional cavity structure. The method additionally includes depositing metal in the first three dimensional cavity structure to form at least one first conductive sidewall layer extending at least partially between the first surface and the second surface of the first optically transparent dielectric layer. The method further includes depositing a first metal layer on the first surface of the first optically transparent dielectric layer, and a second metal layer on the second surface of the first optically transparent dielectric layer. The method also includes patterning the first metal layer on the first surface of the first optically transparent dielectric layer to form a radio frequency input-output (RF I/O) region, and a first ground plane around a perimeter of the RF I/O region and electrically isolated from the RF I/O region.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
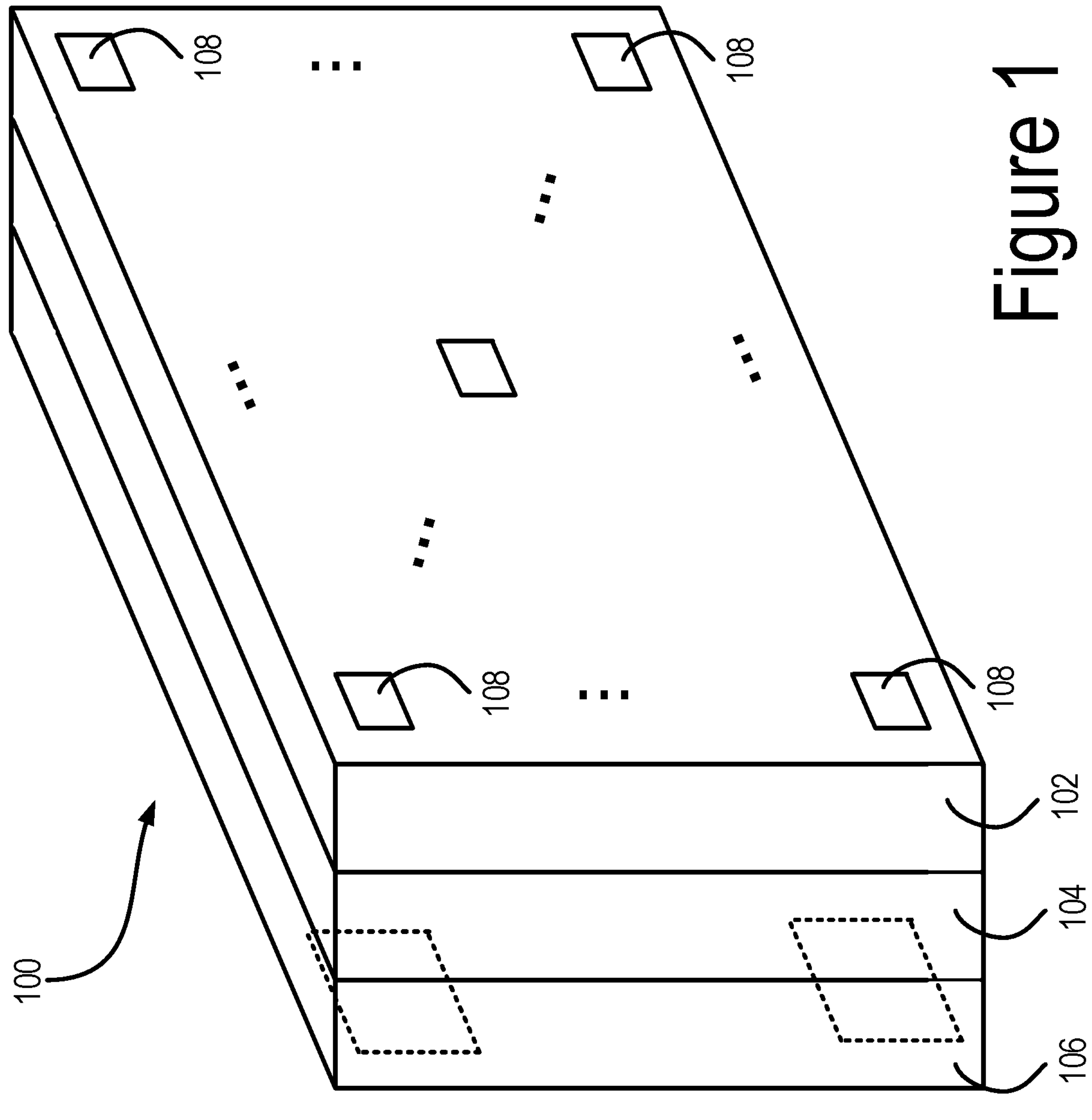
FIG. 1 shows an example phased array transceiver, in accordance with various implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

In active phased array antenna applications, antenna elements and electronic components needed in a transmit (or receive) function associated with each antenna element are preferably small enough to fit within a unit antenna element area. The unit antenna element area is based on the frequency of operation and the maximum scan angle of the antenna beam. For example, for a "5G" cellular frequency of about 39 GHz and a beam scan angle of about 45°, the unit element area is about $(0.6\ \text{lambda})^2$ or 0.026 square inches. By way of example, such a unit element area can be within the range of 0.01 to 0.08 square inches. Here, lambda is the Free Space wavelength. This antenna element spacing is the maximum that can be employed which can prevent grating lobes in the phased array antenna radiation pattern over a 45° scan angle. A Grating lobe is an antenna radiation in an undesired direction. As a result, to prevent grating lobes and to enable a +/−45° antenna beam scan, the example antenna based on 39 GHz as the frequency of operation would have approximately 38 or more radiating elements per square inch. There is also a challenge of having filters and associated electronics (e.g., amplifiers and phase shifters) of appropriate size to fit within this unit antenna element area. Other frequencies of operation can include 6 GHz (or below), 28 GHz, 55-75 GHz, 120 GHz, as examples.

Microwave and millimeter wave filters are typically designed and fabricated as individual or discrete components which connect into a larger system (e.g. a transmit and/or receive system) via solder surface mount, via coaxial connectors, or via waveguide connections. Generally the filters require each individual filter to be tested and tuned, due to lack of adequate physical/electrical precision in such discrete components. However, carrying out individual testing and tuning and assembly on a phased array antenna having 38 filters and antenna elements per square inch can be very challenging due to the sheer number of filters to be individually tested and tuned. Further, in some phased array applications, filters between the antenna elements and the active transmit/receive circuitry are not employed when the filters exhibit unacceptable insertion loss causing degradation of the signal to noise ratio and range of the phased array antenna. On the other hand, having filters in this front end location can be useful in protecting the antenna system from interfering signals. This is a system trade-off based on filter performance in rejecting interferers, versus insertion loss to the desired signal. Sufficiently small size (e.g., antenna element spacing constraint) and integration and electrical interconnection with array components are important considerations as well.

The anticipated explosion of millimeter wave or microwave phased arrays for commercial '5G' wireless communications and in satellites is expected to result in a dense network of transmit and/or receive arrays operating simultaneously in closely spaced frequencies. To mitigate the inherent interference issues, front end filters (filters between the antenna elements and active circuits) of very low insertion loss should be used.

The following description discusses radio frequency devices, and in particular, millimeter-wave or microwave filter arrays that can be utilized in millimeter-wave or microwave phased array antennas. The filter array mitigates or avoids the drawbacks associated with other filter approaches discussed above. In particular, the filter array has a high quality factor (Q) in the order of about 1000 to about 2000, compared to the Q of about 100 to about 300 of conventional filters in this frequency range conforming to size and integration requirements. The high Q enables the filter array to have a very low insertion loss. For example, the filter array can have an insertion loss of below 1 dB (e.g., 0.8 dB, 0.5 dB, and so on). A filter implemented in the prior art with similar rejection performance would exhibit over 3 dB insertion loss rendering it unacceptable for use in this front end location.

The filter array can be manufactured using precision manufacturing techniques that obviate the need for individual tuning of filter elements. As a result, filter arrays with high density, such as those to be used for high frequency cellular applications, can be manufactured with high reliability. In order to provide an array of high performance millimeter wave or microwave filters, material properties, physical precision of dielectric and metal geometry, and alignment and bonding methods must be highly repeatable. The materials and processes described herein have these desired attributes.

Also discussed below is an integrated phased array filter-antenna, which includes the filter and antenna elements within the same integrated unit cell. The integrated phased array filter antenna exhibits high gain, high Q, and low insertion loss, which can make the integrated phased array filter-antenna well suited for high frequency '5G' cellular applications.

Also discussed below are processes for manufacturing the filter array and the integrated phased array filter-antenna. The process for manufacturing utilizes high precision 3D laser irradiation methods that allow precise positioning and hence fabrication of the filter and antenna elements at high density.

In some embodiments, a radio frequency device further includes an array of filter unit cells including the first filter unit cell formed in the first dielectric layer of the dielectric material, and a second filter unit cell of the array of filter unit cells positioned adjacent to the first filter unit cell, where the second filter unit cell includes a second plurality of sidewalls of the cavities defined by the dielectric material, at least one sidewall of the second plurality of sidewalls and at least one sidewall of the first plurality of sidewalls defining a cavity of the cavities. The second filter unit cell also includes second conductive sidewall layers disposed over at least portions of the second plurality of sidewalls, the second conductive sidewall layers defining a second resonant space comprising some of the dielectric material. The second filter unit cell additionally includes the first conductive layer formed on the first surface, covering at least a portion of the second resonant space and electrically connected to the second conductive sidewall layers. The second filter unit cell also includes a second RF I/O contact formed on the first surface, the second RF I/O contact electrically isolated from the first conductive layer by a second isolation region formed around at least a portion of a perimeter of the second RF I/O.

In some embodiments, within the same cavity, at least one of the first conductive sidewall layers is spaced apart from at least one of the second conductive sidewall layers. In some embodiments, within the same cavity, at least one of the first conductive sidewall layers and at least one of the second conductive sidewall layers make contact to fill at least a portion of the same cavity.

In some embodiments, the radio frequency device also includes a second dielectric layer of the dielectric material having a first surface and an second surface opposing the first surface, the second dielectric layer formed on the first dielectric layer, and having a second plurality of cavities, each of the second plurality of cavities extending between the first surface and the second surface of the second dielectric layer. The first filter unit cell also includes a second conductive layer formed on the second surface of the first dielectric layer covering at least a portion of the first resonant space and electrically connected to the first conductive sidewall layers, the second conductive layer having a first aperture, a third plurality of sidewalls of the second plurality of cavities, and third conductive sidewall layers formed on at least portions of the third plurality of sidewalls, the third conductive sidewall layers defining a third resonant space comprising some of the dielectric material, the third conductive sidewall layers electrically connected to the second conductive layer formed on the second surface of the first dielectric layer, the first aperture positioned between the first resonant space and the third resonant space.

In some embodiments, at least a portion of the first surface of the second dielectric layer is bonded with the second surface of the first dielectric layer. In some embodiments, the device further includes a first bonding surface of the first dielectric layer, the first bonding surface including at least a portion of the second surface of the first dielectric layer and a portion of the second conductive layer. In some embodiments, the radio frequency device also includes a second bonding surface of the second dielectric layer, the second bonding surface including at least a portion of the first surface of the second dielectric layer and at least a portion of a patterned metal layer formed on the first surface of the second dielectric layer. In some embodiments, the first bonding surface of the first dielectric layer is bonded with the second bonding surface of the second dielectric layer. In some embodiments, a center of the first resonant space and a center of the third resonant space are separated by a distance that is less than a quarter wavelength of a frequency of operation.

In some embodiments, the dielectric material is an optically transparent dielectric material. In some embodiments, the dielectric material has a relative dielectric constant of at least 2. In some embodiments, the dielectric material comprises at least one of fused silica, quartz, single crystal silicon carbide, or single crystal sapphire. In some embodiments, the first plurality of sidewalls includes four sidewalls. In some embodiments, at least one of the first conductive sidewall layers is discontinuous. In some embodiments, at least one of the first conductive sidewall layers has a mesh pattern or structure. In some embodiments, the first filter unit cell further includes an antenna ground plane formed on the second surface of the first dielectric layer, covering at least a portion of the first resonant space of the first dielectric layer and electrically connected to the first conductive sidewall layers, and an antenna element formed on the second surface of the first dielectric layer, the antenna element electrically isolated from the antenna ground plane by an antenna element isolation region formed around at least a portion of a perimeter of the antenna element. In some embodiments, the antenna element is aligned with the first RF I/O.

In some embodiments, the radio frequency device further includes an antenna dielectric layer of the dielectric material having a first surface and a second surface opposing the first surface, the antenna dielectric layer formed on the first dielectric layer, the antenna dielectric layer having antenna layer cavities, each of the antenna layer cavities extends between the first surface and the second surface of the antenna dielectric layer. The first filter unit cell also includes a second conductive layer formed on the second surface of the first dielectric layer covering at least a portion of the first resonant space of the first dielectric layer and electrically connected to the first conductive sidewall layers, the second conductive layer having a first aperture. The first filter unit cell also includes an antenna layer plurality of sidewalls of the antenna layer cavities. The unit cell further includes antenna layer conductive sidewall layers formed on at least portions of the antenna layer plurality of sidewalls, the antenna layer conductive sidewall layers defining an antenna layer resonant space comprising some of the dielectric material, the antenna layer conductive sidewall layers electrically connected to the second conductive layer formed on the second surface of the first dielectric layer, the first aperture positioned between the first resonant space and the antenna layer resonant space. The unit cell also includes an antenna ground plane formed on the second surface of the antenna dielectric layer covering at least a portion of the antenna layer resonant space, and electrically connected to the antenna layer conductive sidewall layers, and an antenna element formed on the second surface of the antenna dielectric layer, the antenna element electrically isolated from the antenna ground plane by an antenna element isolation region formed around at least a portion of a perimeter of the antenna element, wherein the antenna element is aligned with the first RF I/O contact. In some embodiments, the first RF I/O contact being electrically isolated from the first conductive layer includes having a resistance of at least $10^{14}$ ohms between the first RF I/O contact and the first conductive layer. In some embodiments, the first conductive sidewall layers include at least one of copper, gold, silver, or aluminum.

In some embodiments, a method for forming the radio frequency device further includes providing a second optically transparent dielectric layer having a first surface and a second surface opposing the first surface of the second optically transparent dielectric layer, and bonding the second surface of the first optically transparent dielectric layer with the first surface of the second optically transparent dielectric layer. In some embodiments, the method further includes irradiating, using the laser, a second three dimensional structure in the second optically transparent dielectric layer, the second three dimensional structure including a second plurality of sidewall regions extending at least partially between the first surface and the second surface of the second optically transparent dielectric layer. In some embodiments, the method further includes etching the second three dimensional structure to form a second three dimensional cavity structure, and depositing metal in the second three dimensional cavity structure to form at least one second conductive sidewall layers extending at least partially between the first surface and the second surface of the second optically transparent dielectric layer.

In some embodiments, the method further includes depositing and patterning metal on the second surface of the second optically transparent dielectric layer to form a second RF I/O region, and a second ground plane around a perimeter of the second RF I/O region and electrically isolated from the second RF I/O region. In some embodiments, the method further includes depositing and patterning metal on the first surface of the second optically transparent dielectric layer to form a third ground plane. In some embodiments, the method further includes depositing and patterning the metal on the first surface of the second optically transparent dielectric layer to provide a second metal layer aperture, the second metal layer aperture for coupling a resonant space in the first optically transparent dielectric layer to a resonant space in the second optically transparent dielectric layer. In some embodiments, the method further includes installing a coupling structure for coupling a resonant space in the first optically transparent dielectric layer to a resonant space in the second optically transparent dielectric layer.

In some embodiments, the method further includes depositing and patterning metal on the first surface of the second optically transparent dielectric layer to form a second bonding surface, and patterning the second metal layer on the second surface of the first optically transparent dielectric layer to form a first bonding surface. In some embodiments, the method further includes bonding the first optically transparent dielectric layer to the second optically transparent dielectric layer by bonding the first bonding surface with the second bonding surface. In some embodiments, the method further includes aligning an aperture in the first bonding surface with an aperture in the second bonding surface. In some embodiments, the method further includes verifying that a plurality of portions of the first optically transparent dielectric layer or the second optically transparent dielectric layer has measurements corresponding to within 0.5 percent of a mean value of a dielectric constant of the corresponding first optically transparent dielectric layer or the second optically transparent dielectric layer.

In some embodiments, the method further includes introducing, by the irradiation, defects in the first optically transparent dielectric layer or the second optically transparent dielectric layer, in a range of one to ten microns in dimension. In some embodiments, the method further includes irradiating, using the laser, the first three dimensional structure in the first optically transparent dielectric layer to produce at least a 200:1 etch selectivity relative to a non-irradiated portion of the first or second optically transparent dielectric layer. In some embodiments, the method further includes depositing metal in the first three dimensional cavity structure using a sputtering or plating technique. In some embodiments, the method further includes depositing metal in the first three dimensional cavity structure, the metal comprising at least one of copper, gold, silver, or aluminum over an adhesion layer. In some embodiments, the method further includes depositing the metal in the first three dimensional cavity structure to have a thickness of between 0.5 to 3 microns. In some embodiments, the method further includes applying an electro-less surface oxidation barrier layer.

In some embodiments, the method further includes providing a third optically transparent dielectric layer having a first surface and a second surface opposing the first surface of the third optically transparent dielectric layer. The method further includes irradiating, using the laser, a third three dimensional structure in the third optically transparent dielectric layer, the third three dimensional structure including a plurality of sidewall regions extending at least partially between the first surface and the second surface of the third optically transparent dielectric layer. The method also includes etching the third three dimensional structure to form a third three dimensional cavity structure. The method further includes depositing metal in the third three dimensional cavity structure to form at least one third conductive sidewall layers extending at least partially between the first surface and the second surface of the third optically transparent dielectric layer. The method further includes bonding the second surface of the second optically transparent dielectric layer with the first surface of the third optically transparent dielectric layer.

Filter Array

FIG. 1 shows an example phased array transceiver 100. The phased array transceiver 100 includes three portions or layers: an antenna array layer 102, a filter array layer 104, and a circuit layer 106. The antenna layer can include an array of antenna elements 108 arranged in two-dimensional grid-like fashion. The antenna elements 108 can include patch antenna elements, which can include conductor patches or pads that form the radiating surface of the antenna array. In some examples, the antenna elements 108 can include radiating elements that extend normal or perpendicular to the surface of the antenna array layer 102. The spacing between adjacent antenna elements 108 can be based on the desired frequency of operation. For example, for a wavelength λ of the frequency of operation, the antenna elements 108 can be arranged such that centers of any two adjacent antenna elements 108 in the same row or column are separated by a distance equal to about λ/2 (in free space). For 5G applications for instance, one of the operating frequencies is 39 GHz, which results in a λ of about 0.4 inches.

The circuit layer 106 can include integrated circuits that provide signals to, and receive signals from, the filter array layer 104. The circuit layer 106 can include integrated circuits that include transmission and/or receiving circuitry, amplification circuitry, phase shifter circuitry, etc. In some examples, the circuit layer 106 can include an array of integrated circuits, where each integrated circuit in the array processes signals for a corresponding filter element in the filter array layer 104 and an antenna element in the antenna array layer 102. In some examples, each integrated circuit in the circuit layer 106 can process signals associated with a plurality of corresponding filter elements and corresponding antenna elements. For example, each integrated circuit in the circuit layer 106 may process signals associated with four antenna elements 108 and four corresponding filter elements. The number of antenna elements or filter elements associated with each integrated circuit may be based on surface area and size limitations imposed by the frequency of operation of the phased array transceiver 100. As an example, an integrated circuit dedicated to processing signals associated with four antenna elements 108 and four corresponding filter elements can have a size of about λ/2×λ/2. At 39 GHz, the size can be about 0.15 inches×0.15 inches. In some examples, at 30 GHz, the integrated circuits (ICs) including their package on the circuit layer 106 may occupy about 36% of the total area of the circuit layer, but at 39 GHz, that may increase to about 64%, and result in a clearance of about 60 mils. To maintain short radio frequency (RF) path lengths, and equal path lengths between RF ICs and filter and antenna elements, the ICs should be somewhat smaller than the unit element area. In some examples, integrated transceiver ICs manufactured by Anokiawave can be utilized for certain applications.

The filter array layer 104 can include an array of filter unit cells that can be arranged in a similar manner as the arrangement of the antenna elements 108 on the antenna layer 102. The filter array layer 104 can include the same number of filter unit cell as there are antenna elements 108 in the antenna layer 102. Each filter unit cell can fit within a footprint or unit area of an antenna element, for a spatially efficient configuration. A filter unit cell may be positioned to be aligned with the corresponding antenna element 108 on the antenna layer. The filter array layer 104 can filter signals communicated to and from the antenna layer 102.

Figure 2:
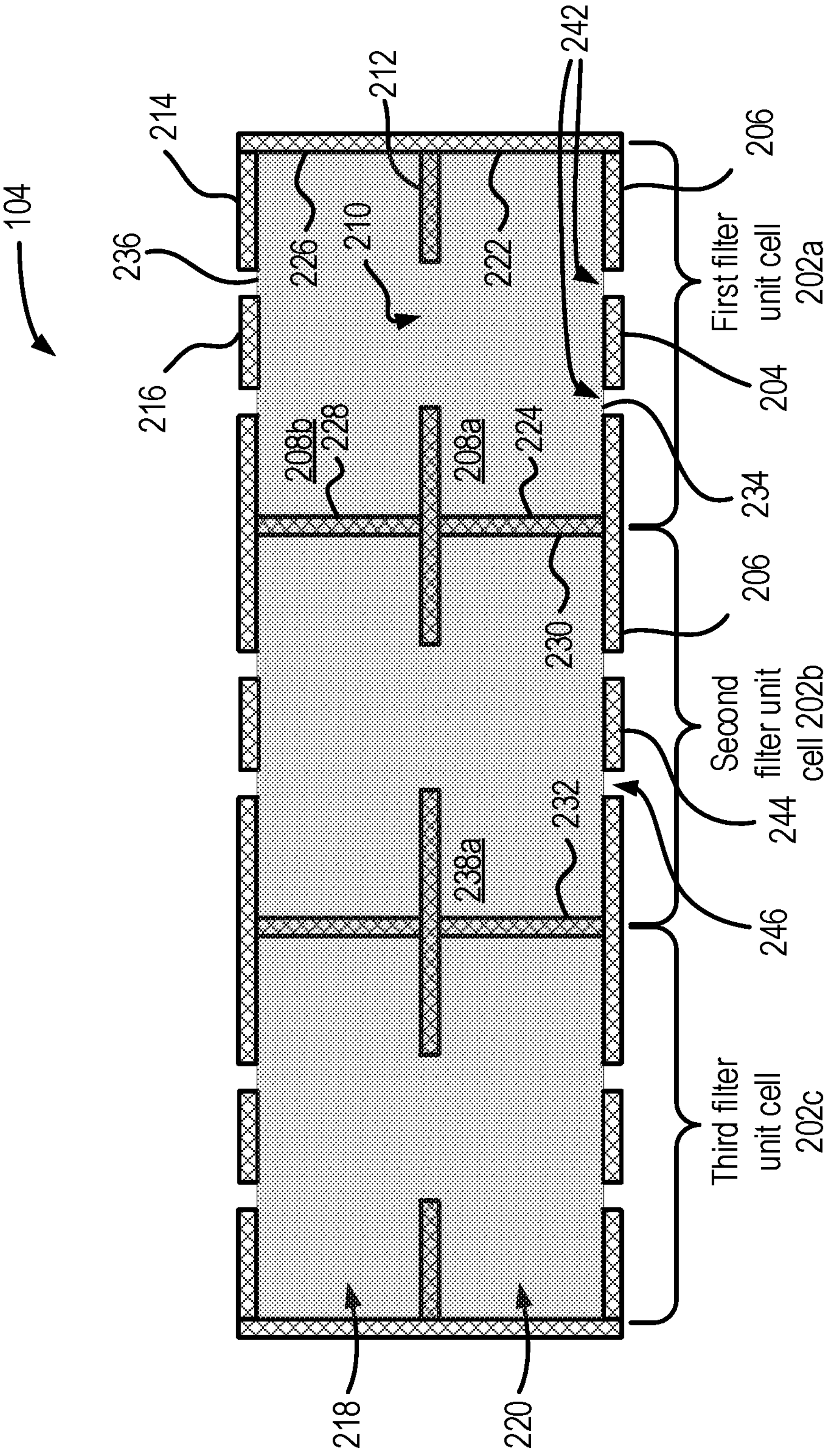
FIG. 2 shows a cross sectional view of an example filter array layer, in accordance with various implementations.

FIG. 2 shows a cross sectional view of an example filter array layer 104. The filter array layer 104 can include an array of filter unit cells. For example, FIG. 2 shows a first filter unit cell 202*a*, a second filter unit cell 202*b* and a third filter unit cell 202*c* (collectively referred to as "filter unit cells 202"). Each filter unit cell includes at least one dielectric layer formed of a dielectric material. For example, the filter unit cells 202 in FIG. 2 include two dielectric layers: a first dielectric layer 220 and a second dielectric layer 218. The dielectric layers can be formed of an optically transparent dielectric material, such as for example, fused silica, quartz, single crystal silicon carbide, single crystal sapphire, and the like. In some embodiments, the dielectric layer can be formed of a crystalline (e.g., formed of a single crystal) dielectric material and/or a dielectric of material that is isotropic. In some embodiments, the dielectric layers can be formed of a dielectric material with a thermal conductivity of at least 1 Watt meter per degree Kelvin (e.g., fused Silica, Silicon carbide, sapphire). The dielectric layers can be formed of a dielectric material with a temperature stability above a predefined threshold (e.g., corresponding to a temperature coefficient of frequency being less than 100 ppm/° C., or less than 20 ppm/° C.). The dielectric layers can be formed of a dielectric material with a low loss tangent, e.g., a loss tangent of less than 0.002 (such as 0.0001). The dielectric layers can be formed of a dielectric material that is more solid and rigid than dielectric materials (e.g., pliable, flexible or drillable dielectric materials) currently used in circuit boards. Rigid dielectric materials which do not mechanically distort during thermal and other processes can minimize dimensional feature variation or resultant layer to layer alignment error of coupling aperture features, or dimensional distortion of resonant spaces which can result in filter frequency response defects. For example, a 39 GHz filter fabricated with a dielectric layer composed of a material with a dielectric constant of 3.8 can have resonant space x-y dimensions of about 0.080 inches, and a dimensional accuracy of less than 0.5% shall result in a dimensional tolerance of 4/10,000 of an inch. In some examples, the relative dielectric constant (sometimes generally referred herein as dielectric constant) of the dielectric layer can be at least about 2 (e.g., a value within the range of 2 and 100). To enable realization of a resonator (a constituent component of a filter) to be contained within a single layer of dielectric and have finite thickness walls and be smaller than the antenna unit element (~λ/2), the dielectric constant must be somewhat greater than 1 (e.g., above 2.1, 3.5 or another value). The geometry of a filter array can support the fabrication of a filter in any suitable dielectric material (e.g., a low loss dielectric, with a temperature stable dielectric constant). Higher dielectric constant materials can be employed to reduce the physical size of the filter resonators and thus reduce the filter size. The dielectric material can be selected to form a filter resonator with a Q of 1000 or greater.

Each unit cell 202 can include a number of conductive sidewall layers that extend between a bottom surface and a top surface of the unit cell. For example, the first unit cell 202*a* includes first conductive sidewall layers 222 and 224 formed in the first dielectric layer 220. The second unit cell 202*b* includes second conductive sidewall layers 230 and 232 formed in the first dielectric layer 220 also formed in the first dielectric layer 220. As discussed in further detail below, the conductive sidewall layers can be formed on sidewalls of cavities defined in the first and second dielectric layers 220 and 218. The conductive sidewall layers can include any conductive material, such as for example, copper, aluminum, silver, gold, or conductive alloys. Metals with the highest possible electrical conductivity can be used to provide maximum filter resonator Q. The first conductive sidewall layers 222 and 224 can define a resonant space 208*a* (also referred to as "a first resonant space") of the first unit cell 202*a* in the first dielectric layer 220, while the second conductive sidewall layers 230 and 232 define a resonant space 238*a* of the second unit cell 202*b* in the first dielectric layer 220.

A bottom surface 234 (or first surface of the first dielectric layer 220) of the unit cells 202 includes a first ground plane 206 (also referred to as "a first conductive layer") which is a metallized layer formed of a conductive material. The first ground plane 206, and ground planes in general, can be conductive surfaces that can be electrically connected to electric ground potential. The bottom surface 234 of the first unit cell 202*a* can include a first radio frequency input/output (RF IO) contact pad 204, which is electrically isolated from the first ground plane 206 by first isolation region 242. Similarly, the bottom surface of the second unit cell 202*b* can include a second RF IO contact pad 244 also electrically isolated from the first ground plane 206 by a second isolation region 246. In some embodiments, electrical isolation can refer to a resistance of at least $10^{14}$ ohms, or some other defined value. Similarly, a top surface 236 of the unit cells 202 can include a second ground plane 214 and/or a second RF IO contact pad 216 that is electrically isolated from the second ground plane 214. In some embodiments, a metallized trace can be connected between the first ground plane 206 and the first RF IO contact pad 204 to provide an inductance coupling at the frequency of operation (e.g., at 39 GHz). However, in such embodiments, despite the presence of the metallized trace, the first RF IO contact pad 206 can be considered to be electrically isolated from the first ground plane 206 as long as the inclusion of the metallized trace does not alter the voltage standing wave ratio (VSWR) of the unit cell 202*a* to more than 3:1. The VSWR of the unit cell 202*a* without any metallized trace can be in the range of 1:1 to 2:1. In some embodiments, the metallized trace can have a width of less than 0.5 millimeter. Each of the one or more metallized traces can be formed of a material used for the first ground plane 206 or first RF IO contact pad 204, or a different material. In some embodiments, the metallized trace can be formed as a narrow trace that has a length to width ratio of at least 3:1. The second RF IO contact pad 216 can be considered to be electrically isolated from the second ground plane 214 in a manner similar to the electrical isolation of the first RF IO contact pad 204 and the first ground plane 206 discussed above. The first and second RF I/O contact pads 204 and 216 can provide electrical contacts to the integrated circuits on the circuit layer 106 and the antenna elements 108 on the antenna layer 102.

The unit cells 202 can include an intermediate metallized layer 212 (also referred to as "a second conductive layer" or "a third ground plane") including a first aperture 210. The intermediate metallized layer 212 can be formed on a second surface of the first dielectric layer 220 opposing the bottom surface 234. The intermediate metallized layer 212 is positioned between the first dielectric layer 220 and the second dielectric layer 218, and is electrically connected to the first conductive sidewall layers 222 and 224. The intermediate metallized layer 212 covers at least a portion of the resonant space 208*a* of the first unit cell 202*a* in the first dielectric layer 220. The first unit cell 202*a* includes third conductive sidewall layers 226 and 228 that extend between the two opposing surfaces of the second dielectric layer 218. The third conductive sidewall layers 226 and 228 define a resonant space 208*b* (also referred to as "a third resonant space") of the first unit cell 202 in the second dielectric layer 218. The first aperture 210 is positioned between the resonant spaces 208*a* and 208*b* of the first unit cell 202*a*. Each resonant space can contribute a pole in the unit cell filter transfer function. While two resonant spaces are shown in FIG. 2, in some examples, the unit cells 202 may include only one resonant space or may include more than two resonant spaces. The resonant spaces are formed within the dielectric material of the two dielectric layers 218 and 220. Additional dielectric layers can be added to the unit cells 202 to add additional resonant spaces. Adding additional resonant spaces can increase the slope of the frequency response of the unit cells 202. As a result, the selectivity of the unit cells can be increased. In some examples, the insertion loss of the unit cell can be an inverse function of the Q of the resonant spaces. Therefore, increasing the Q of the resonant spaces can reduce the insertion loss of the unit cell 202. The resonant spaces can each have a controlled resonant frequency as needed to realize a desired filter response.

Each filter of a filter array 104 can include one or more resonators with controlled coupling elements interconnecting the one or more resonators, as well as radio-frequency input or outputs (RF I/Os) with controlled couplings. To achieve a desired frequency response from a filter, each resonator should have a specific predetermined resonant frequency, and the couplings between each resonator as well as the coupling between the input contact and first resonator and the output contact and the last resonator should be of a specific and predetermined value. Each resonator can correspond to the resonant space 208 or resonant cavity discussed above. A resonant space or resonant cavity can be a building block of three-dimensional cavity or waveguide filters. A resonant space can include a substantially metal coated or enclosed dielectric-filled volume, for instance formed by a combination of metal walls (e.g., 222 & 224) and surface ground planes (e.g., 206, 212 & 214), A resonant space can generally have physical dimensions of approximately $\lambda/2\times\lambda/2$ in the x-y plane, which can be rectangular or circular in shape for example. For a dielectric-filled resonant space, the physical dimensions corresponding to $\lambda/2$ are reduced by a factor of (1/√ (dielectric constant)). Hence, the use of such dielectric-filled resonant spaces can reduce the size of the corresponding filter structure as compared to a free-space $\lambda/2$ antenna element spacing—the nominal spacing of filters in the filter array. In some embodiments, the resonant spaces can have a height or thickness that is less than half the width of the resonant space. For example, the first resonant space 208*a* can have dimensions where a distance between the first ground plane 206 and the intermediate metallized layer 212 is less than half the distance between the first conductive sidewall layers 222 and 224. In some embodiments, a distance between a center of the first resonant space 208*a* and a center of the third resonant space 208*c* can be less than a quarter wavelength of the frequency of operation.

The coupling structures, as disclosed herein, can include apertures (e.g., aperture 210) or "Irises" in the metal ground layers between resonant spaces. The apertures can be replaced with a variety of alternative coupling structures, including metal pins that extend between the resonant spaces in the two dielectric layers 220 and 218. For example, a metal pin can extend from a center of the first resonant space 208*a*, through the aperture 210 and to a center of the third resonant space 208*b*. In some embodiments, the metal pin can extend between any two points: one within the first resonant space 208*a* and another within the third resonant space 208*b*. The metal pin can be embedded within the dielectric material. The metal pin can be utilized instead of or in addition to the aperture 210, and can offer added freedom to form magnetic or electric field couplings or combinations thereof. Another alternative for a coupling element or coupling structure can include an etched hole (between the two dielectric layers 220 and 218, for example, positioned between the two resonant spaces 208*a* and 208*b*) that is metallized (e.g., sidewalls of the etched hole plated with metal). The apertures (e.g. first aperture 210) however could be considered the simplest to construct, amongst the alternatives. The apertures and alternatives are hereafter generally referred as coupling structures. Various descriptions in this disclosure may use or reference apertures by way of illustration, but it should be understood that any coupling structure can apply.

The thickness or height of the unit cells 202 can affect the Q of the unit cells 202. For example, the Q can increase with an increase in the thickness of the unit cells 202. However, the rate of increase in the Q with respect to the thickness can asymptotically decrease as the thickness approaches a value that is half the size of the dimension of the unit cells in the x-y direction (the thickness being measured in the z dimension normal to the x-y plane). As an example, at 39 GHz, and with the x-y dimensions being about one tenth of an inch, the dielectric thickness of a resonant space can be selected to be about 15 mils, or no more than about 50 mils.

The first conductive sidewall layers 222 and 224 can have a thickness of about 0.1 mils or greater. A metallic wall between two adjacent unit cells (e.g., the first unit cell 202*a* and the second unit cell 202*b*) can be formed of a single wide wall (e.g., by metallizing one sidewall/portion of cavity, or by filling the cavity partially or completely with metal), or 2 separate walls (e.g., by metallizing two opposite sidewalls/portions of a cavity, or by metallizing one sidewall/portion of each of a pair of adjacent cavities, or by filling each of the pair of adjacent cavities partially or completely with metal), or a number of discrete metallized cavities (e.g., any number of cavities arranged in a row or formation to collectively form the metallic wall), commensurate with defining the respective resonant spaces with prescribed resonant frequencies while maintaining the desired physical spacing associated with the antenna element spacing. One or more of the cavities and the conductive sidewalls can be formed through the whole thickness of the dielectric layer, or partially along the thickness. Each of the cavities and the conductive sidewalls in the dielectric layer can be formed of any shape or size. Metallization can be perform on a partial portion of a sidewall of a cavity, or on the whole sidewall. The ground planes 206 and 214 and the RF IO contact pads can have a thickness of about 0.1 mils or greater. The sizes of the aperture 210 can be based on the desired bandwidth of the filter. In some examples, the width of the aperture 210 can be about 20% to 25% of the dimension of the resonant spaces within the plane of the aperture 210. The aperture 210 can have any shape, such as circular, elliptical, and polygonal (regular or irregular). In some examples, the filter array layer 104 can include 32, 64, 128, or 256 unit cells 202. For example, a filter array having 256 unit cells can have a size of about 2.4 inches by 2.4 inches at 39 GHz.

In some embodiments, the conductive sidewall layers (e.g., the first conductive sidewall layers 222 and 224, the second conductive sidewall layers 230 and 232, and the third conductive sidewall layers 226 and 228) can be discontinuous. In particular, the conductive sidewall layers can include apertures, holes or gaps such that at least some portions of the corresponding sidewall of the cavities on which the conductive sidewall layers are deposited are not covered by the conductive material. In some embodiments, the conductive sidewall layers can have a mesh pattern or structure. That is, a conductive sidewall layer can have a pattern or structure with regularly spaced apertures. In some embodiments, the conductive sidewall layers can include a set of strips of conductive material that are separated from each other.

Figure 3:
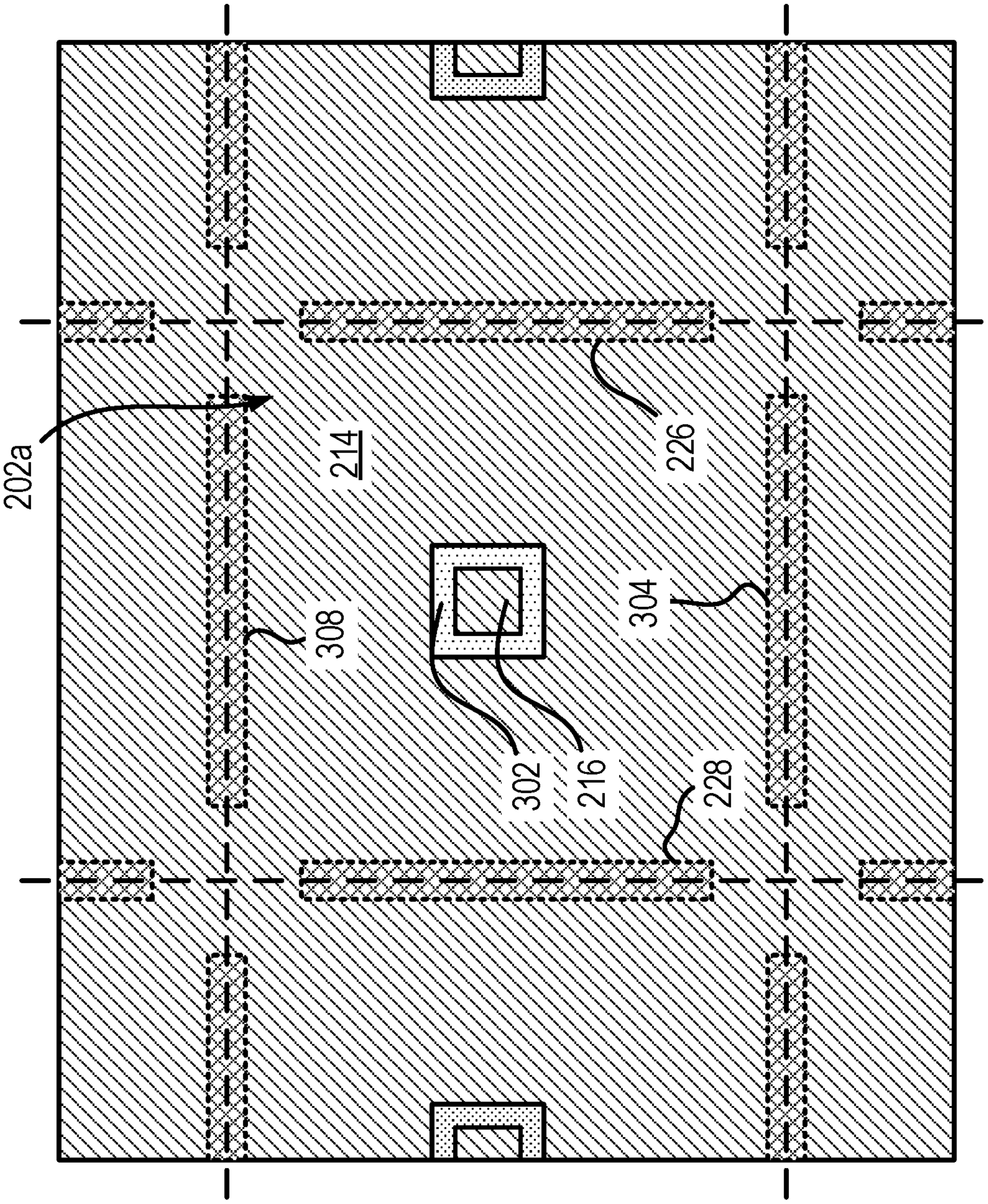
FIG. 3 shows a top view of a portion filter array show in FIG. 2.

FIG. 3 shows a top view of the filter array 104 shown in FIG. 2. Boundaries of individual unit cells are shown by broken lines. FIG. 3 shows the first unit cell 202*a* including the second ground plane 214 and the RF IO contact pad 216. The RF IO contact pad 216 is positioned within the perimeter of the second ground plane 214, and is electrically isolated from the second ground plane 214 by an isolation region 302. The first unit cell 202*a* includes two additional third conductive sidewall layers 304 and 308 in addition to the two third conductive sidewall layers 226 and 228 shown in FIG. 2.

In some embodiments, at least some edges of the third conductive sidewall layers 226, 228, 304, and 308 that are perpendicular to the plane of the top surface 236 of the second dielectric layer 218, may not abut with edges of the adjacent third conductive sidewall layers to form a fully enclosed resonant space or resonant cavity. To abut or have adjacent edges of two conductive sidewall layers be in contact, dielectric material separating these adjacent edges would have to be etched away. However, if one was to etch the dielectric layer all the way through on all 4 sides (to form a fully enclosed resonant space or resonant cavity), the dielectric material forming the resonant cavity would separate from the dielectric layer and can fall out of the dielectric layer. Instead of a fully enclosed resonant cavity, cavities in the dielectric layer are etched to apply metal coating to form the conductive sidewalls, while maintaining some dielectric material (e.g., in a gap, to form a web or other supporting structures) between or around the cavities to structurally support the resonant cavity in the dielectric layer. The metal coating to form a conductive sidewall layer can be thin (e.g., ~3 times skin depth at the operating frequency to achieve minimum insertion loss for the filter, where the skin depth refers to a depth of the conductive sidewall layer where current density is a predefined percentage (e.g., 37%) of the current density at the surface of the conductive sidewall layer at the operating frequency). The cavities can be plated full of metal such as copper to provide higher mechanical strength and enhanced thermal conductivity. By leaving some regions of dielectric between at least some adjacent conductive sidewalls (or cavities) to separate the adjacent metallized walls (or cavities), the resonant cavity can be held mechanically in the structure and processed as one structure in an array of resonant cavities formed within a single dielectric layer. Hence, at least two of the third conductive sidewalls 226, 228, 304, and 308 can be separated by a gap comprising the dielectric material of the second dielectric layer 218 (e.g., in the region between the top surface 236 and the bottom surface of the second dielectric layer 218). As one non-limiting example, the third conductive sidewalls can have all except one pair of adjacent edges abut, forming a shape similar to a letter U or C with a partially-enclosed resonant space in the middle. The limited amount(s) of separation or number of gap(s) can still form a substantially continuous metal wall that enables higher Q resonators and consequently lower filter insertion loss.

The implementation discussed above is in contrast with using printed circuit board (PCB) layers with mechanically drilled holes (i.e., circular vias) with plated metal. Mechanically drilled holes do not provide sufficient precision to achieve the desired size and structural features of the filter, resulting in degraded frequency accuracy and filter frequency response, as well as degraded voltage standing wave ratio (VSWR), which results in excess signal loss. Moreover, the finish of the surface of the holes achievable by mechanical drills is inferior to the etching technique disclosed herein, and can affect application of a metal coating on the surface, as well as precision and size of metal and/or dielectric geometry. In addition, dielectric loss of PCB materials is large compared to materials proposed herein for the dielectric layer.

Integrated Filter-Antenna Array

FIGS. 1-3 above discussed example embodiments of a filter layer including an array of filter unit cells that can be positioned between a circuit layer and an antenna layer. The following description discusses example embodiments where antenna elements are integrated into the filter array to form an integrated filter-antenna array.

Figure 4:
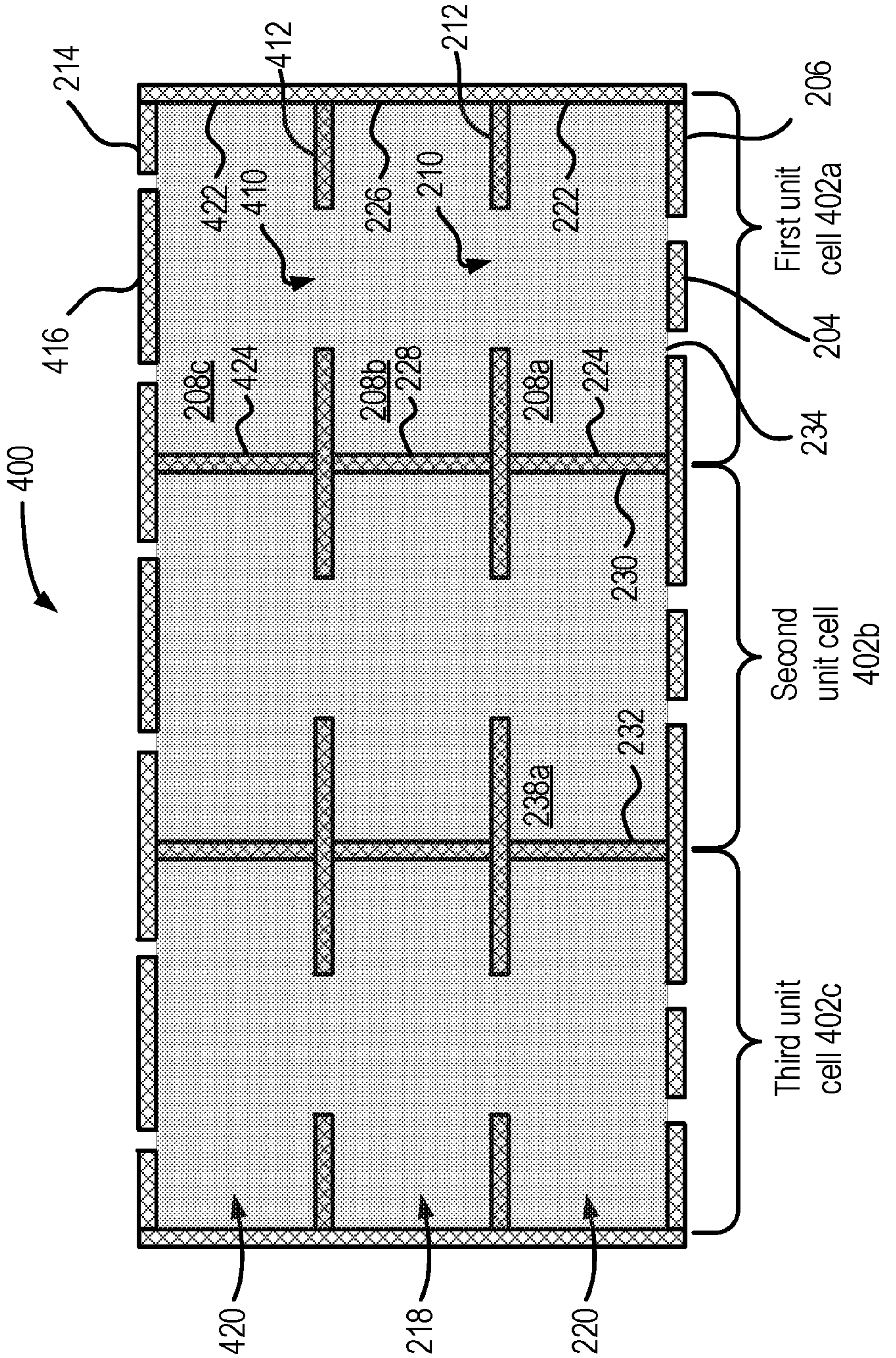
FIG. 4 shows an example integrated filter-antenna array, in accordance with various implementations.

FIG. 4 shows a cross-sectional view of an example integrated filter-antenna array 400. FIG. 4 shows three unit cells of the filter-antenna array 400: a first unit cell 402*a*, a second unit cell 402*b*, and a third unit cell 402*c* (collectively referred to as "filter-antenna unit cells 402"). In some respects, the filter-antenna array 400 is similar to the filter array 200 shown in FIG. 2, in that filter-antenna unit cells 402 (e.g., the first unit cell 402*a*) of the filter-antenna array 400 can include two dielectric layers 220 and 218, conductive sidewall layers 222, 224, 226, and 228, an input RF IO contact pad 204 and the first ground plane 206, a first intermediate ground plane 212 and a first aperture 210, and two resonant spaces 208*a* and 208*b* within the dielectric material. However, unlike the filter array 200 which includes another RF IO contact pad on the top surface 236 of the second dielectric layer 218, the filter-antenna array 400 instead includes an antenna element 416, that can be similar to the antenna element 108 discussed above in relation to FIG. 1. The antenna element 416 can form a patch radiator for transmission and reception of radio frequency signals. In addition, the filter-antenna array 400 shown in FIG. 4 includes an additional second intermediate ground plane 412 and aperture 410, an additional third dielectric layer 420 (also referred to as "an antenna dielectric layer"), and additional fourth conductive sidewalls 422 and 424 (also referred to as "antenna layer conductive sidewall layers"), which are electrically connected to the intermediate ground plane 412 and the second ground plane 214. The fourth conductive sidewalls 422 and 424 can be deposited on antenna layer plurality of sidewalls (similar to sidewalls 912 discussed below in reference to FIGS. 9A-9C, but formed in the third dielectric layer 420) of cavities defined by the dielectric material in the third dielectric layer 420. As a result, the first filter-antenna unit cell 402*a* includes three resonant spaces 208*a*, 208*b*, and 208*c* forming a three-pole filter. This embodiment enables realizing a cavity backed patch antenna element and shielding which enhances antenna element performance and reduces undesired antenna element interaction (known as mutual coupling).

In some embodiments, the first filter-antenna unit cell 402*a* may be structured to include only two resonant spaces like that shown in the filter array 200 of FIG. 2. In such instances, the filter-antenna array 400 may not include the second dielectric layer 218, and the third dielectric layer (also referred to as "the antenna dielectric layer") 420 can be directly disposed over the first dielectric layer 220. In such embodiments, the fourth conductive sidewall layers 422 and 424 can define the third resonant space 208*c* (also referred to as "an antenna layer resonant space") and can be electrically connected to the ground plane 212 formed on the first dielectric layer 220 and the second ground plane 214 formed on the second or top surface of the third dielectric layer 420. The first aperture 210 can then be positioned between, and couple the first and the third resonant spaces 208*a* and 208*c*. In some embodiments, the filter antenna array 400 may include only one resonant space 208*a*. In such instances, the filter-antenna array 400 may not include the second and the third dielectric layers 218 and 420. The second ground plane 214 can function as the antenna ground plane and can instead be formed on the top surface of the first dielectric layer 220 along with the antenna element 416. The second ground plane 214 can be electrically connected to the first conductive sidewall layers 222 and 224.

In some examples, the first unit cell 402*a* may include more than three resonant spaces. By integrating the antenna elements within or onto the same package (of dielectric layers) that includes the filter, the filter-antenna array 400 does not require a separate antenna layer such as the antenna layer 102 shown in FIG. 1. This embodiment enables fabrication of filters with an arbitrary number of resonators within the antenna element unit cell area, providing the freedom to realize high selectivity and low loss filters while still employing the "single board" or "Tile" array fabrication method which is preferred for low cost phased arrays, such as those used for "5G" commercial communications applications. This can reduce the cost and time of manufacture of the integrated filter-antenna array, for example. Dimensions of various elements of the integrated filter-antenna array 400 are similar to the dimensions of corresponding elements discussed above in relation to the filter array 200 shown in FIG. 2.

Figure 5:
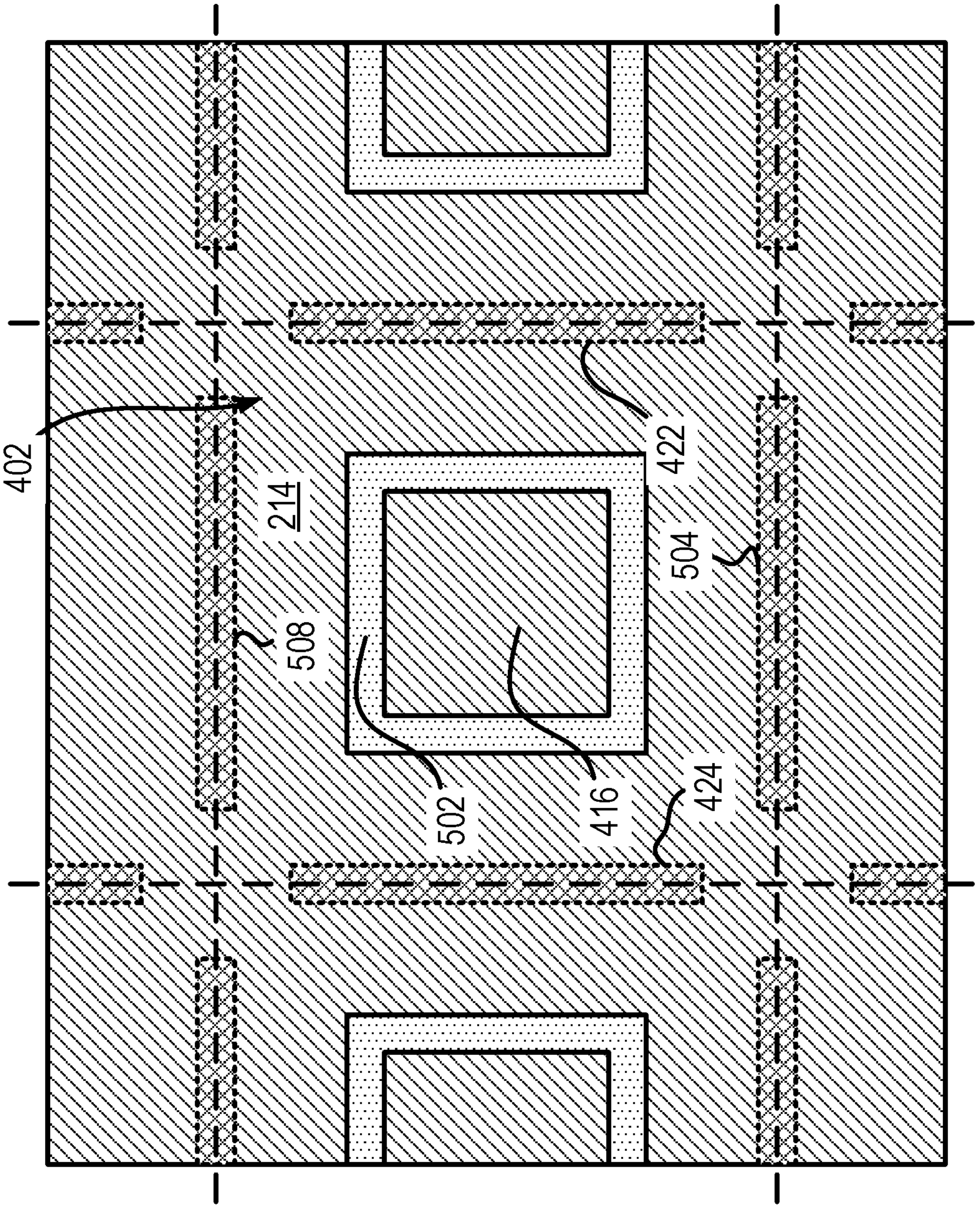
FIG. 5 shows a top view of a portion of the integrated filter-antenna array shown in FIG. 4.

The dimensions of the antenna element 416 can be based on the frequency of operation of the filter-antenna array. By way of a non-limiting example, a patch antenna element for 39 GHz operation can have x-y dimensions of about 0.090 inches square for an implementation using fused silica as dielectric material with a dielectric constant of 3.8. FIG. 5 shows a top view of the integrated filter-antenna array 400 shown in FIG. 4. Boundaries of individual filter-antenna unit cells are shown by broken lines. The top view shows two more fourth conductive sidewalls 508 and 504 in addition to the fourth conductive sidewalls 422 and 424 shown in FIG. 4. The antenna element 416 is positioned within the perimeter of the second ground plane 214 (also referred to as "an antenna ground plane"). However, the antenna element 416 is electrically isolated from the second ground plane 214 by an isolation region 502 (also referred to as "an antenna element isolation region") that is formed from the dielectric material of the dielectric layer 420 shown in FIG. 4. As mentioned above with respect to the electrical isolation of the first RF IO contact pad 204 and the first ground plane 206, a metallic trace can be introduced between the antenna element 416 and the second ground plane 214 while still maintaining electrical isolation there between. That is, the antenna element 416 can be considered to be electrically isolated from the second ground plane 214 despite a metallized trace between the antenna element 416 and the second ground plane 214 as long as the inclusion of the metallized trace does not alter the VSWR of the unit cell 402*a* to more than 3:1. The VSWR of the unit cell 402*a* without the metallized trace can be between 1:1 and 2:1, for example.

The antenna element 416 can be positioned to be aligned with the first RF IO contact pad 204. For example, a geometric center of the antenna element 416 can be aligned with the geometric center of the first RF IO contact pad 204. In some embodiments, the antenna element 416, the first RF IO 204 and at least one of the intermediate apertures coupling resonant spaces are aligned. For example, the antenna element 416, at least one of the first aperture 210 and the second aperture 410, and the first RF IO contact pad 204 can be aligned.

Figure 6A:
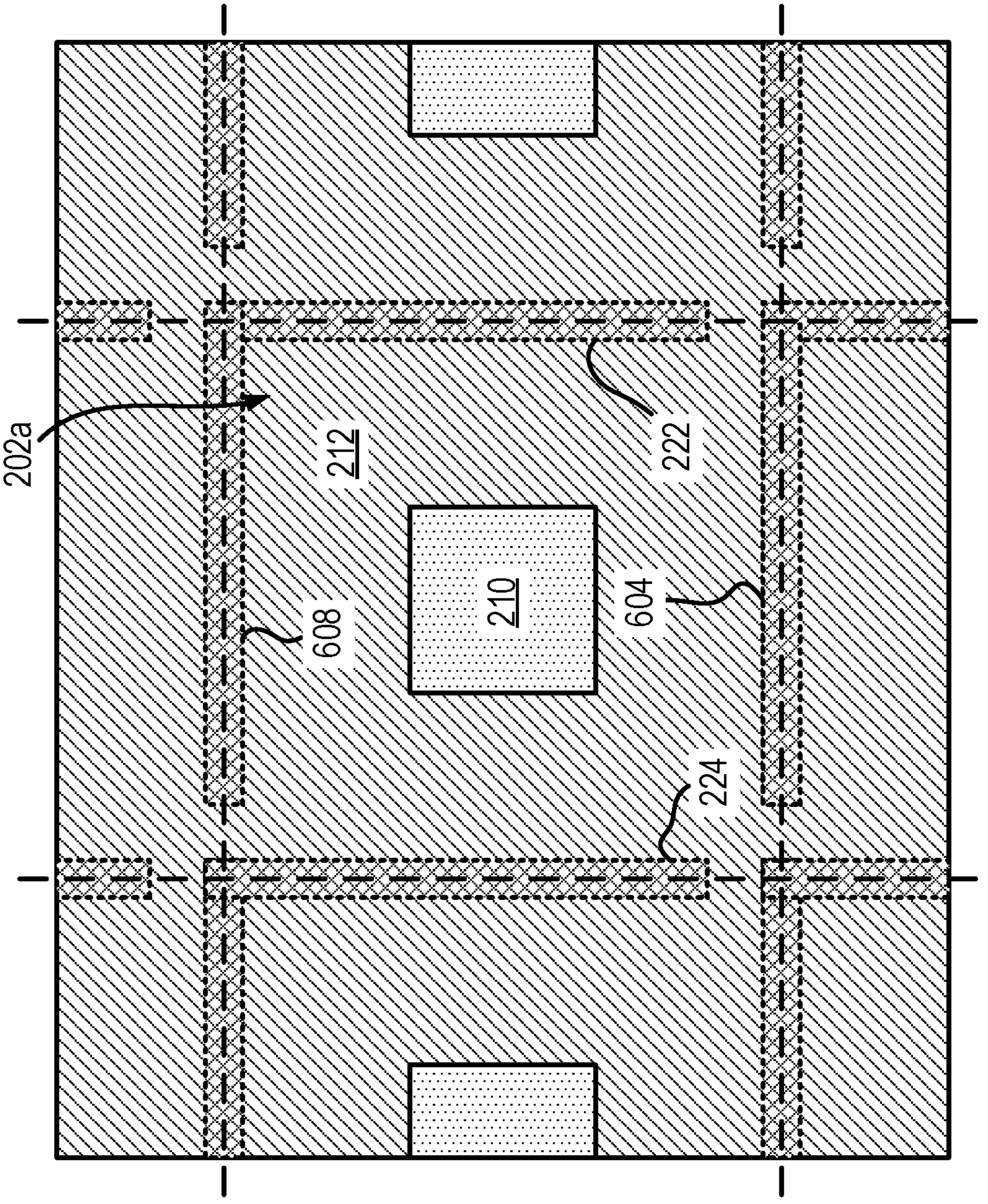
FIGS. 6A and 6B show top views of portions of two dielectric layers with different metallized sidewall patterns that can improve mechanical stability of a filter array, in accordance with various implementations.
Figure 6B:
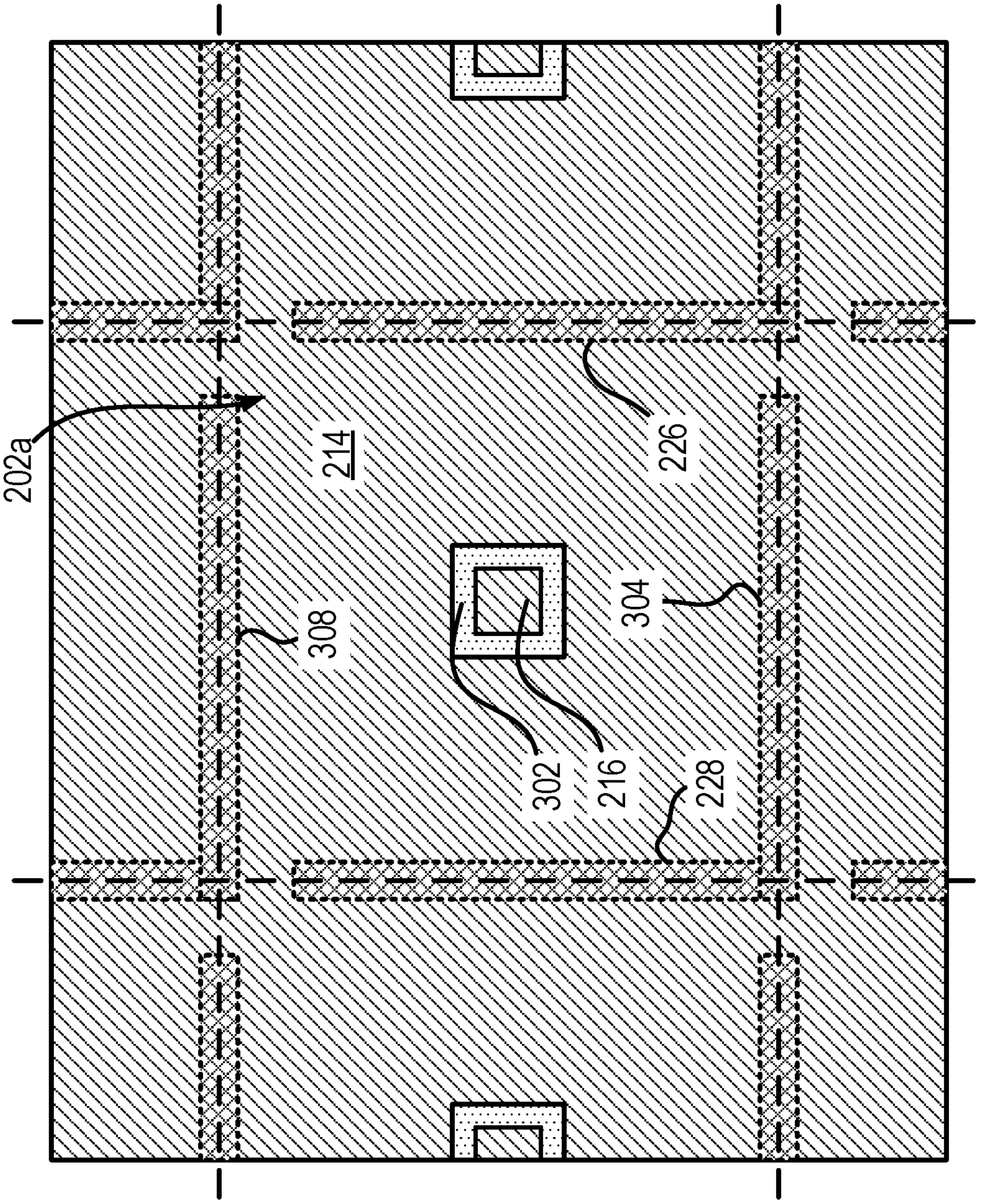

FIGS. 6A and 6B show top views of example embodiments of two dielectric layers with different conductive sidewall patterns. The use of such conductive sidewall patterns can improve mechanical stability of a filter array and/or reduce manufacturing costs, for example, relative to some other embodiments discussed herein. For example, FIGS. 6A and 6B show the top views of the first dielectric layer 220 and the second dielectric layer 218 of the filter array 104 shown in FIG. 2. The structure of the first conductive sidewalls 222, 224, 604, and 608 in the first dielectric layer 220 is different from, and complementary to the structure of the third conductive sidewalls 226, 228, 304, and 308 in the second dielectric layer 218 shown in FIG. 6B. For example, referring to FIG. 6A, one end each of the first conductive sidewalls 608 and 222 are joined together. In contrast, referring to FIG. 6B, one end each of the third conductive sidewalls 228 and 304 are joined at the end. When the filter array is manufactured by stacking the second dielectric layer 218 over the first dielectric layer 220, the complementary structure of the sidewalls in these layers can improve the mechanical strength of the filter array. In some examples, other complementary patterns may also be utilized.

Process of Manufacture of a Filter Array and an Integrated Filter-Antenna Array

Figure 7A:
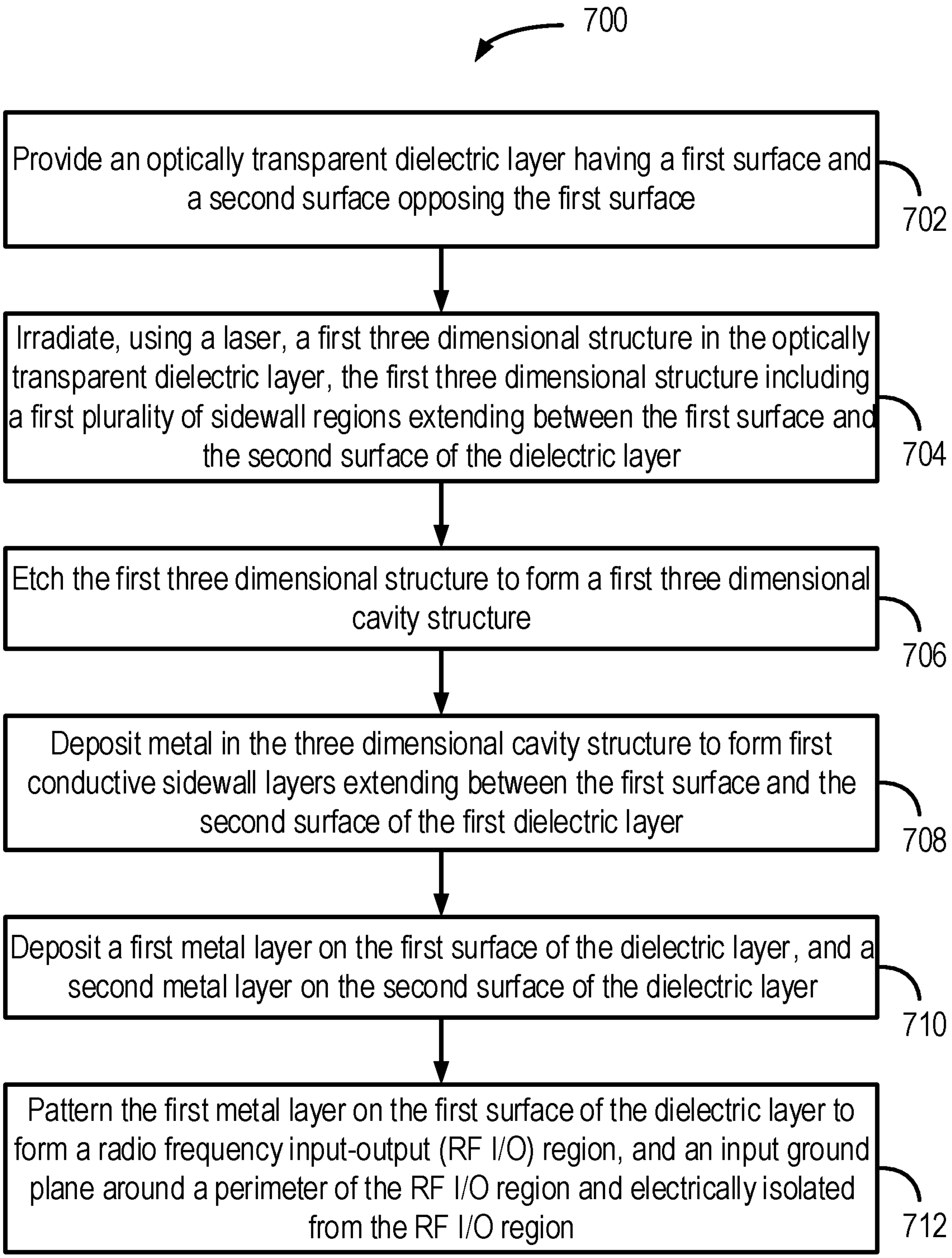
FIG. 7A shows a flow diagram of a process of manufacture of the filter array, in accordance with various implementations.

FIG. 7A shows a flow diagram of a process 700 of manufacture of the filter array discussed above in relation to FIGS. 1-3. The method includes providing an optically transparent dielectric layer having a first surface and a second surface opposing the first surface (702). The optical transparency allows irradiation, by laser, of portions of the dielectric layer that are within an interior of the dielectric layer. The dielectric layer can have a size that is about 4-12 inches (e.g., limited by processing equipment such as etch bath capacity) across and thickness of about 0.01 to about 0.05 inches. The dielectric layer can be formed of an optically transparent dielectric material such as fused silica, quartz, single crystal silicon carbide, single crystal sapphire, and the like. The process can further include an inspection of the dielectric layer for visual defects. The dielectric layer can further be inspected for consistency in thickness, camber, and surface finish. The dielectric layer may also be tested to verify that the dielectric constant is within the acceptable range of the desired dielectric constant. For example, dielectric constants at various portions of the first dielectric layer 220, the second dielectric layer 218 or the third dielectric layer 420 can be measured and the mean of the measured dielectric constants for a dielectric layer can be determined. Further, it can be verified that the dielectric constants measured at various portions of a dielectric layer is within 0.5 percent of the mean value of dielectric constant for that layer. Further, the dielectric layer can undergo cleaning to remove any foreign substances.

Figure 9A:
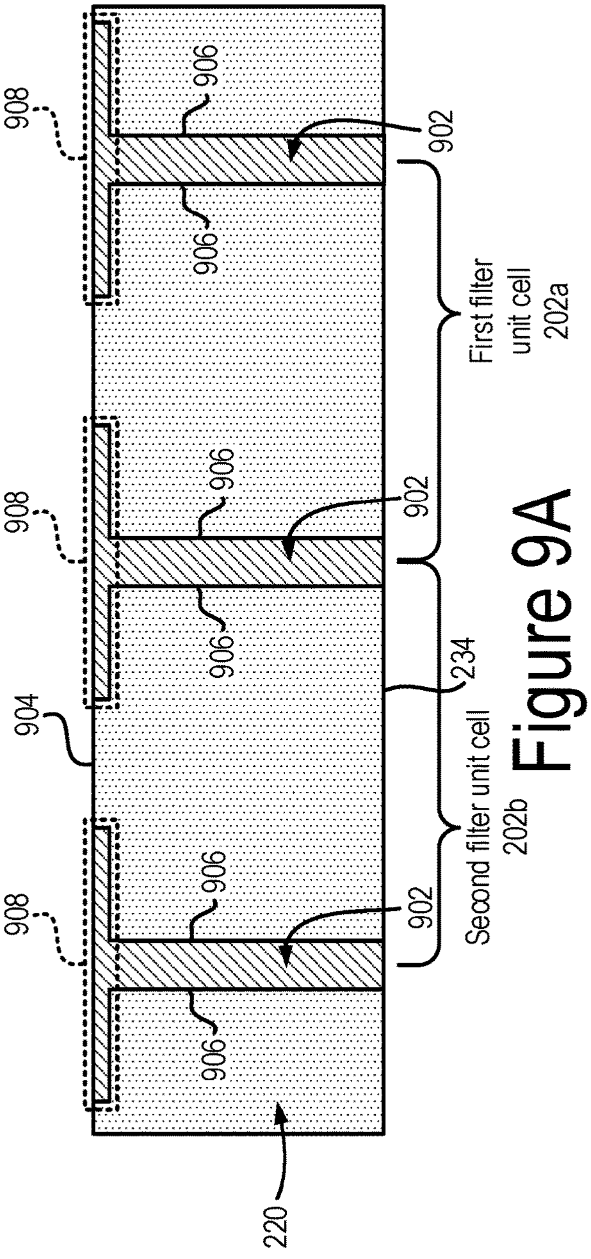
FIGS. 9A-9C show cross-sectional views of portions of the filter array at various stages of manufacture.

The process further includes irradiating, using a laser, a three dimensional structure in the optically transparent dielectric layer, the three dimensional structure including a plurality of sidewall regions extending at least partially between the first surface and the second surface of the dielectric layer (704). The laser can operate anywhere from infra-red to ultra-violet wavelengths, and can produce laser pulses with pico-second to femto-second pulse lengths. The laser can be focused on any location within the dielectric layer to irradiate that location. The irradiated region does not have to be through the entire thickness of the dielectric layer (e.g., from top surface to bottom surface). Most regions of the walls employed in these filter arrays can be continuous between top and bottom surfaces. Some regions, particularly at wall intersections, may be partially through, providing mechanical strength as well as the electrical shielding of the radio-frequency energy (thus enabling a Hi-Q resonator). The laser can be maneuvered to irradiate the three dimensional structure within the dielectric layer. During irradiation, the laser may modify the material properties or introduce defects in the dielectric material that have sizes in the range of a few microns. The defects can be introduced (e.g., uniformly within a volume of a particular structural shape) via irradiation, and can facilitate selective etching. FIG. 9A shows a cross sectional view of an irradiated three-dimensional structure in a dielectric layer. In particular, FIG. 9A shows irradiated three-dimensional structures 902 (also referred to as a "first three dimensional structure") formed in the first dielectric layer 220. The irradiated three-dimensional structures 902 can include a plurality of sidewall regions 906 that can extend at least partially between the first surface 234 and a second surface 904 of the first dielectric layer 220. The three-dimensional irradiated structure 902 can include an indented irradiated region 908 that, when etched, can form an indented region to form an indented second surface 904.

Figure 9B:
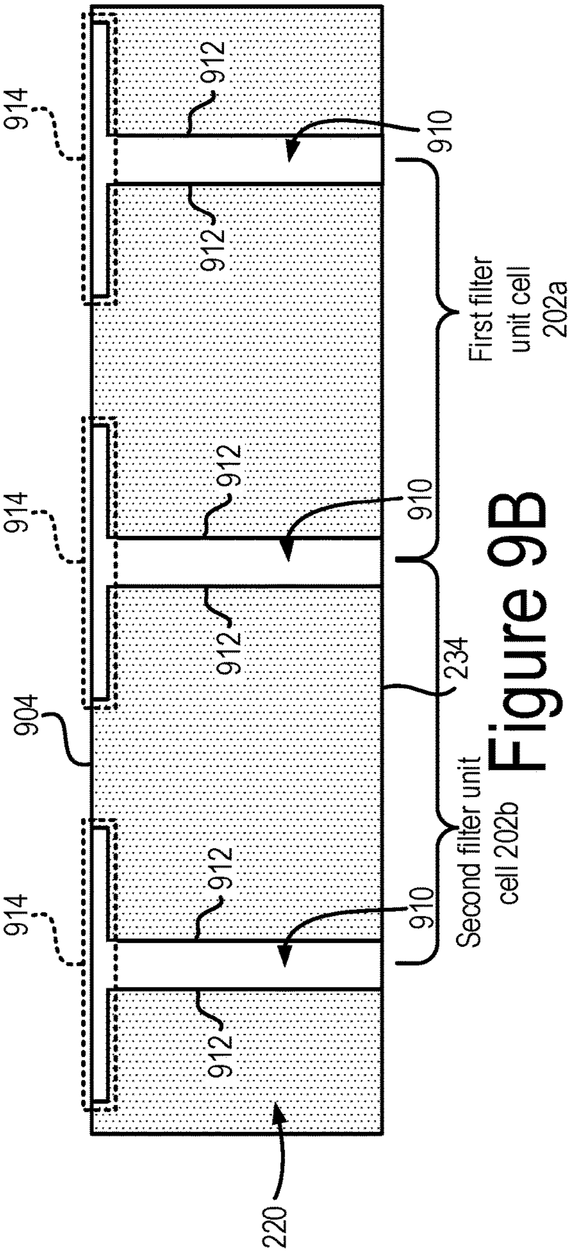

The process can also include etching the three dimensional structure to form a three dimensional cavity structure (706). The irradiated dielectric layer can for instance be placed in an etch bath which can etch the portions of the dielectric layer that have been exposed to or irradiated by the laser. For example, the etching can start from a surface that is irradiated and work down through the material (e.g., precisely or substantially constrained along and/or within the defects introduced by the laser). In some examples, the etchant can include potassium hydroxide. The irradiated three dimensional structure can have a 1000:1 etch selectivity relative to the non-irradiated portions of the dielectric layer, for example, for precise etching. In some embodiments, the etch selectivity can be 500:1, 200:1, 100:1, or some other ratio. The laser irradiated geometry (of the three dimensional structure) can be compensated to account for effects of the etch selectivity to produce a higher precision resulting geometry. After etching in the etch bath, the three dimensional structure can be transformed into a three dimensional cavity structure. Any number and/or combination of three dimensional structures can be realized in a similar fashion, e.g., concurrently and/or sequentially. FIG. 9B shows a cross sectional view of an etched three-dimensional structure in a dielectric layer. In particular, FIG. 9B shows three-dimensional cavity structures 910 formed after etching the three-dimensional irradiated structures 902 shown in FIG. 9A. The three-dimensional cavity structures 910 can include a plurality of sidewalls 912 that, in part, define the boundaries of the cavity structures 910. The plurality of sidewalls 912 are surfaces of the dielectric material of the first dielectric layer 220, and define at least portions of the three-dimensional cavity structures 910. The plurality of sidewalls 912 can extend at least partially between the first surface 234 and the second surface 904 of the first dielectric layer 220. The three dimensional cavity structures 910 can include an indented region 914 that is indented from the plane of the second surface 904 of the first dielectric layer 220. As discussed further below, a conductive layer can be formed in the indented region 914 to form a ground plane. In some embodiments, the three dimensional structures 910 may not include the indented region 914, and instead have a second surface 904 that is flat. In such embodiments, a conductive layer deposited over the second surface 904 can have a surface that is offset from (e.g., at a height that is equal to the thickness of the conductive layer) the plane of the second surface 904.

The process can further include depositing metal in the three dimensional cavity structure to form one or more first conductive sidewall layers extending at least partially between the first surface and the second surface of the dielectric layer (708). The process also includes depositing metal onto the first surface of the dielectric layer and metal onto the second surface of the dielectric layer (710). The metal can be deposited using, for example, a sputtering technique. Metals such as copper, gold, or silver over a suitable adhesion layer such as titanium-tungsten (TiW) can be used. The deposition can be carried out for a length of time that allows the thickness of the first conductive sidewall layers and the thickness of the conductive layers on the first and second surfaces to be about 1 to 2 micron thick (or some other range, such as 0.5 to 3 micron, for example). For example, the first conductive sidewall layers can be similar to the sidewalls 222 and 224 shown in FIG. 2. A metal plating process can be employed when thicker metal coatings or metal filled conductive sidewalls layers are desired, for example, when enhanced thermal conductivity or mechanical strength are desired.

The process can also include patterning the metal layer on the first surface of the dielectric layer to form a radio frequency input-output (RF I/O) region and an input ground plane around a perimeter of the RF I/O region, the RF I/O region electrically isolated from the ground plane by an isolation region formed around the perimeter of the RF I/O region, or connected by one or more metallized trace of less than 0.5 millimeter in width to the ground plane across the isolation region (712). A photoresist can be applied to all surfaces of the dielectric layer. The photoresist can include materials such as electrophoretic. The photoresist can be exposed to a pattern that matches the desired pattern for forming the RF I/O contact pad, the metallized trace(s), and/or the ground plane, such as the RF I/O contact pad 204 and the ground plane 206 shown in FIG. 2. An auto-align direct write laser lithography process can be used for exposure. The exposed surfaces can then be etched using an etchant to remove the metal layer from between the RF I/O region and the ground plane around the perimeter of the RF I/O region, thereby electrically isolating the RF I/O region from the ground plane. In some embodiments, a metallic trace (e.g., less than 0.5 millimeter in width, and with length to width ratio of at least 3:1) is retained or formed to provide an inductive coupling between the ground plane and the RF I/O region, while maintaining the electrical isolation between the ground plane and the RF I/O region. The patterning can also include patterning an intermediate ground plane and an aperture such as the intermediate ground plane 212 and the aperture 210 shown in FIG. 2, on the other side of the dielectric layer.

Figure 9C:
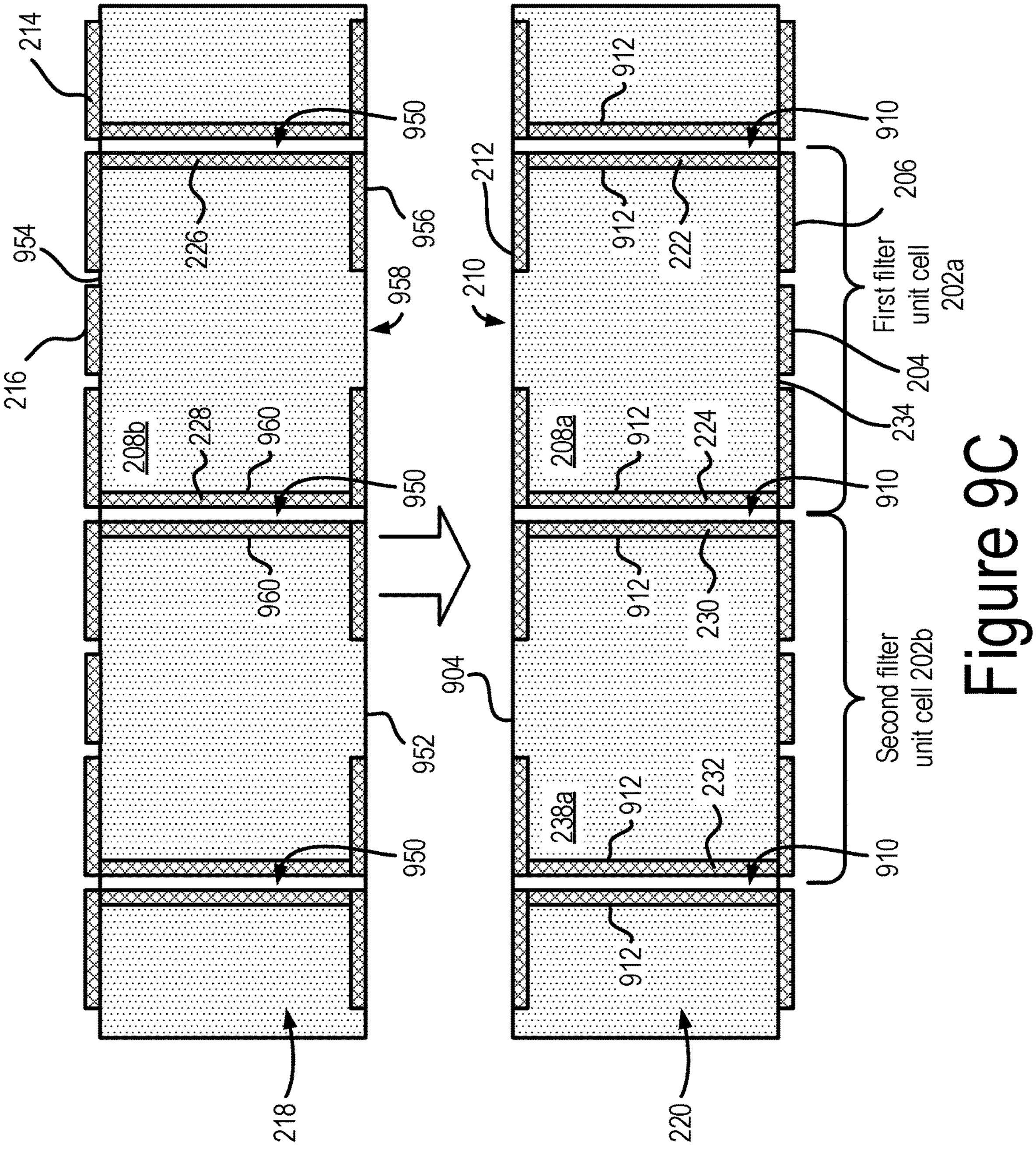

FIG. 9C shows a cross-sectional view of a dielectric layer with patterned metal layers. In particular, FIG. 9C shows a cross-sectional view of the first dielectric layer 220 shown in FIG. 9B that has been deposited with metal and patterned, as described in the operations 710 and 712 above. The first dielectric layer 220 shows the formation of the first and second unit cells 202*a* and 202*b*. The first unit cell 202*a* includes the first conductive sidewall layers 222 and 224 formed on the first plurality of sidewalls (e.g., the plurality of sidewalls 912) of the cavities 910 formed in the first dielectric layer 220. The first conductive sidewall layers 222 and 224 define at least a portion of the first resonant space 208*a*. Similarly, the second unit cell 202*b* includes the second conductive sidewall layers 230 and 232 formed on the second plurality of sidewall cavities 910. In particular, first conductive sidewall layer 224 of the first unit cell 202*a* and the second conductive sidewall 230 of the second unit cell 202*b* (which is adjacent to the first unit cell 202*a*) are formed on the sidewalls of the same cavity structure 910 between the first unit cell 202*a* and the second unit cell 202*b*. FIG. 9C illustrates an example where a partial volume of the three dimensional cavity structures 910 is filled with conductive material to form the conductive sidewall layers (e.g., 224 and 230 in the cavity structure 910). The conductive sidewall layers in the same three dimensional cavity structure 910 are spaced apart or have a gap there between. In some embodiments, at least a portion of a volume of the three dimensional cavity structure 910 can be filled with a conductive material such that there is no separation or gap between at least portions of the conductive sidewall layers 224 and 230 within the cavity structure. That is, the conductive sidewall layers 224 and 230 can make contact to fill at least a portion of the volume of the cavity structure 910. One such example is illustrated in FIG. 2, where a cavity structure between the first unit cell 202*a* and the second unit cell 202*b* is completely filled with a conductive material such that there is no separation or gap between the conductive sidewall layers 224 and 230 of adjacent unit cells 202*a* and 202*b*. The three dimensional cavity structure 910 can be filled with the same conductive material used to form the conductive sidewall layers 224 and 230. For example, during deposition of a conductive material on the first plurality of sidewalls 912 to form the conductive sidewall layers 224 and 230, the deposition can be continued such that the space between the conductive sidewall layers 224 and 230 is filled with the conductive material.

The above process can be repeated to form additional dielectric layers. For example, the process can be used to form the second dielectric layer 218 shown in FIG. 2, which includes a second ground plane 214 and a RF I/O region 216 on one side, an intermediate metal layer that in combination with the intermediate metallized layer 212 forms a first aperture 210 on the other side of the second dielectric layer 218, and third conductive sidewalls 226 and 228. FIG. 9C also shows a cross sectional view of a second dielectric layer 218, that has been processed in a manner similar to that discussed above in relation to the first dielectric layer 220. The second dielectric layer 218 includes second three dimensional cavity structures 950 that can be formed by irradiation with a laser and etching, in a manner similar to that discussed above in forming the first three dimensional cavity structure 910. The second dielectric layer 218 can include a first surface 952 and a second surface 954, where sidewalls 960 (also referred to as "a third plurality of sidewalls") of the second cavity structure 950 extend at least partially between the first surface 952 and the second surface 954 of the second dielectric layer 218. The second dielectric layer 218 is deposited with metal and patterned to form third conductive sidewall layers 226 and 228 that extend between the first surface 952 and the second surface 954 of the second dielectric layer 218. The third conductive sidewall layers also define a resonant space 208*b* of the first unit cell 202*a*.

A metal layer 956 can be deposited on the first surface 952 of the second dielectric layer 218 and can be patterned to form a second aperture 958. The second surface 904 of the first dielectric layer 220, including the intermediate layer 212 can form a first bonding surface. Similarly, the first surface 952 and the metal layer 956 deposited on the first surface 952 of the second dielectric layer 218 can form a second bonding surface. The second dielectric layer 218 can be bonded with the first dielectric layer 220 by bonding the first bonding surface with the second bonding surface. The bonding can result in the metal layer 956 to make contact with the intermediate layer 212 and combine to form the third ground plane 212 with the first aperture 210 (as shown in FIG. 2). In some embodiments, where the second surface 904 of the first dielectric layer 220 and the first surface 952 of the second dielectric layer 218 do not include an indented region (e.g., indented region 914 shown in FIGS. 9A and 9B), the metal layer 956 and the intermediate metallized layer 212 may not be coplanar, respectively, with the first surface 952 and the second surface 904. Thus, the bonding surfaces may not include the first surface 952 and the second surface 904. This may result in an air gap between the first surface 952 and the second surface 904 at the aperture 210.

In some embodiments, the first aperture 210 and the second aperture 958 can be aligned such that the perimeter of the first aperture 210 align with the perimeter of the second aperture 958. After bonding the first dielectric layer 220 with the second dielectric layer 218, the first and the second apertures 210 and the second aperture 958 can form a single aperture.

In some embodiments, the second dielectric layer 218 shown in FIG. 9C can instead represent an antenna dielectric layer (FIG. 4, 420), a metal deposited on the second surface 954 of the antenna dielectric layer can be patterned to form an antenna element (similar to the antenna element 416 shown in FIG. 4) that is isolated from an antenna ground plane (similar to the ground plane 214). The antenna dielectric layer can be directly bonded to the first dielectric layer 220 to form unit cells 202 that include two resonant spaces. In such implementations, the plurality of sidewalls 960 can represent antenna layer plurality of sidewalls of cavities 950 that are defined by the dielectric layer in the antenna dielectric layer. Similarly, the conductive sidewall layers 226 and 228 can represent antenna layer conductive sidewall layers defining an antenna layer resonant space 208*b*, and can be electrically connected to the second conductive layer 212 formed on the second surface 904 of the first dielectric layer.

Figure 7B:
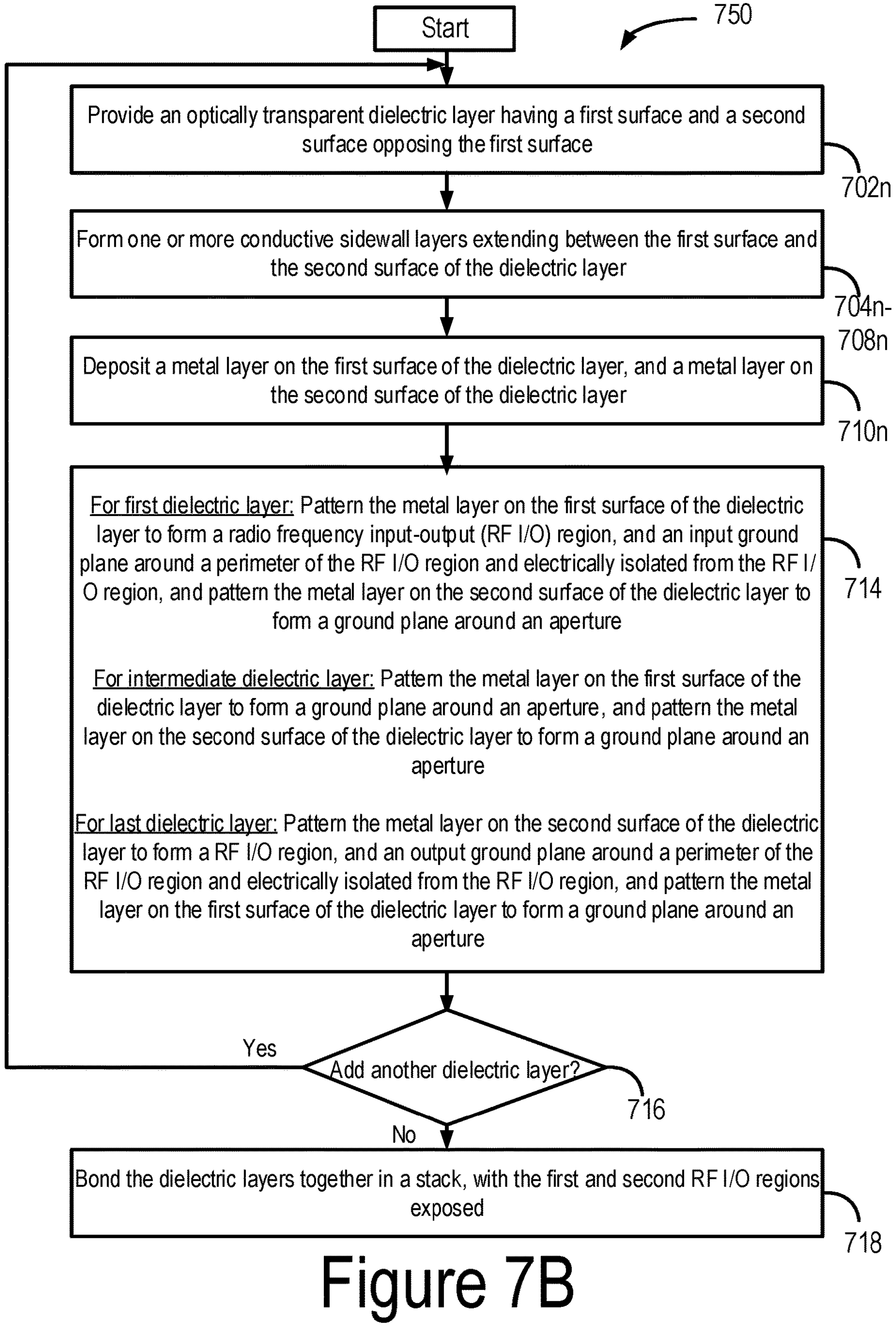
FIG. 7B shows a flow diagram of a process of manufacture of a filter array with multiple dielectric layers, in accordance with various implementations.

Additional dielectric layers can also be patterned if the filter array is designed to include additional resonant spaces. For example, a third dielectric layer can be formed using the process discussed above where the third dielectric layer includes intermediate ground planes and apertures patterned on both sides, as well as sidewalls formed between the two surfaces of the third dielectric layer. This is illustrated in FIG. 7B, which shows a flow diagram of one embodiment of a process 750 of manufacture of a filter array comprising multiple dielectric layers. The process 750 can include operations 702*n* to 710*n* for adding each dielectric layer to the filter array, which can be similar to operations 702 to 710, respectively, as discussed above. Operation 714 describes a portion of the process 750 for the case where the corresponding dielectric layer is the first, the last, or an intermediate layer. Operation 716 describes a decision point where the process 750 can proceed to operation 702*n* to add another dielectric layer, or can proceed to operation 718 to bond the multiple dielectric layers together to form the filter array.

In some embodiments, the process 700 or 750 can also include inspection and measuring of dimensions of each dielectric layer. The process 700 or 750 can further include using a cleaning process (such as a plasma cleaning process) to clean all the surfaces of the dielectric layers and/or metal surfaces. The process 700 or 750 can include aligning and bonding two adjacent dielectric layers. For example, the apertures and/or metallized walls exposed on one surface of a dielectric layer can be aligned with the corresponding aperture and/or metallized walls exposed on a surface of a second dielectric layer. The alignment of metallized walls in adjacent dielectric layers can ensure that there is electrical contact between the metalized walls in one dielectric layer and the metallized walls in the adjacent dielectric layer.

In some embodiments, surfaces of two dielectric layers that are to be stacked adjacent to each other may have the same metallization pattern. For example, referring to FIG. 2, the first dielectric layer 220 and the second dielectric layer 218 may each have the intermediate ground layer 212 along with the apertures 210 patterned. When these two dielectric layers are bonded, the edges of the apertures 210 and/or the edges of the first conductive sidewall layers 222 and 224 on the first dielectric layer 220 are aligned with the edges of the corresponding structures in the second dielectric layer 218. By including the metallization patterns on both dielectric layers, the bonding between the dielectric layers can be improved due to a high bonding strength between metal-to-metal surfaces of the two dielectric layers. In some examples, the thicknesses of the intermediate ground plane 212 on each dielectric layer can be half the desired thickness.

The process 700 or 750 can also include applying an electro-less (or immersion) surface oxidation barrier layer, such as palladium with a thickness of about 0.1 to about 0.2 microns. The oxidation barrier layer can reduce the risk of corrosion of the metal surfaces. The process 700 or 750 can also include verification of the layer bonding, using techniques such as acoustic microscopy. The process can also include carrying out RF probe tests on the filters with a vector network analyzer device. The process 700 or 750 can further include singulating or cutting the stacked dielectric layer assembly (e.g., which can be as much as 12 inches across) into a set of filter unit cells. The process of fabricating a larger array of filter unit cells (e.g., corresponding to available sizes of dielectric layers and/or accommodating capacity of equipment) can be more efficient than directly building a smaller array or smaller stacked dielectric layer assembly. Smaller sections can be cut or singulated from the larger array of filter unit cells, using a laser or saw blade. For example, each singulated dielectric layer assembly can have a size of about 2×2 inches, and can include about 128 filter unit cells. The size and/or number of filter unit cells for each singulated dielectric layer assembly can be determined by the particular application (e.g., corresponding to a desired array size and configuration of antennas).

Once the filter array is manufactured, the filter array can be connected to circuitry, such as the circuit layer 106 shown in FIG. 1. For example, referring to FIG. 2, the bottom surface of the filter array 104 can be bonded to a circuit layer such that the integrated circuits on the circuit layer make electrical contact with the respective RF I/O contact pad 204. The filter array also can be bonded to an antenna array, such as, for example, the antenna layer 102 shown in FIG. 1. For example, referring to FIG. 2, the RF I/O contact pads 216 on the top surface of the filter array 104 can be electrically connected to a respective antenna element 108 of the array of antenna elements on the antenna layer 102

Figure 8:
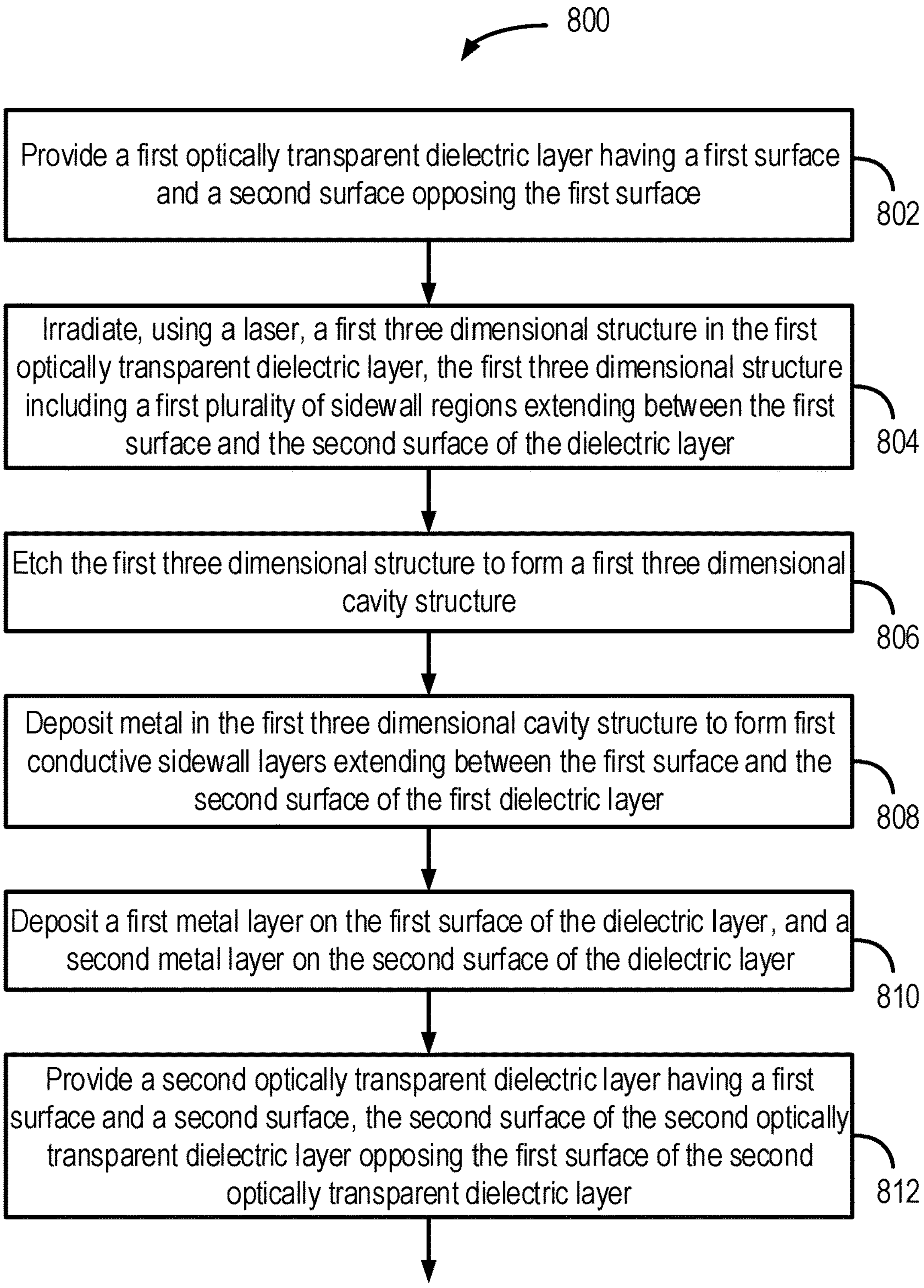
FIG. 8 shows a flow diagram of a process of manufacture of an integrated filter-antenna array, in accordance with various implementations.
Figure 8:
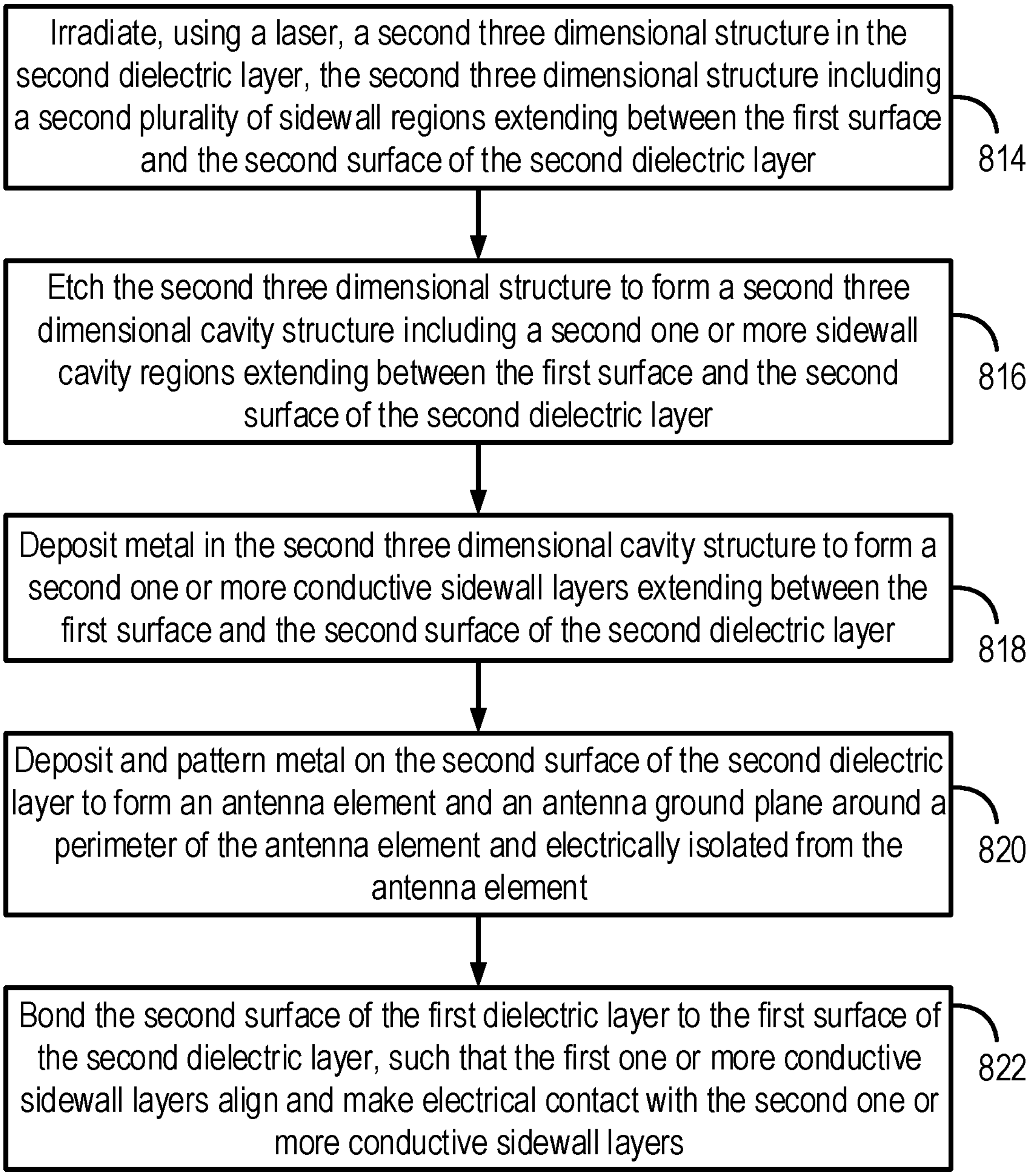

The method for manufacturing the integrated filter-antenna array can be similar to that discussed above in relation to the filter array. FIG. 8 shows a flow diagram for a process 800 of manufacture of an integrated filter-antenna array. Several process stages in the process 800 are similar to those discussed above in relation to process 700 shown in FIG. 7. For example, the process 800 includes stages 802-808 for forming a first one or more conductive sidewall layers in a first dielectric layer, which are similar to the process stages 702-708 discussed above in relation to FIG. 7. The process 800 can further include depositing a metal layer on the surface of the first dielectric layer to electrically connect to the first one or more conductive sidewall layers (810). The metal layer can include for example, an intermediate ground plane, such as the first or second intermediate ground planes 212 and 412 shown in FIG. 4. The process 800 can further include providing a second dielectric layer. The process stages 812-818 for forming a second one or more conductive sidewall layers in a second dielectric layer are similar to the process stages 702-708 discussed above in relation to FIG. 7. The process 800 can also include patterning of the antenna element, such as the antenna element 416 shown in FIGS. 4 and 5, on one surface of one dielectric layer (820). In some embodiments, an antenna element (e.g., a waveguide antenna, or waveguide horn antenna) can be formed in the dielectric layer using laser irradiation, etching to remove dielectric material to form a shape of the waveguide antenna, and depositing metal on surfaces formed by the etching. The process 800 can also include bonding the second surface of the first dielectric layer to the first surface of the second dielectric layer such that apertures patterned on the first and second intermediate ground planes 212 and 412 align with each other or the conductive sidewall layers 222 and 224 in the first dielectric layer 220 align with the conductive sidewall layers 226 and 228 in the second dielectric layer 218 (822). Metallization patterns formed on the second surface of the first dielectric layer, and on the first surface of the second dielectric layer, can be aligned with each other, and bonded with each other. As an example, FIG. 4 shows the first dielectric layer 220 bonded to the second dielectric layer 218 such that an aperture patterned on the top surface of the first dielectric layer 220 aligns with an aperture patterned on a bottom surface of second dielectric layer 218. The conductive sidewall layers 222 and 224 in the first dielectric layer 220 can align with the conductive sidewall layers 226 and 228 in the second dielectric layer 218.

Once the integrated filter-antenna array is manufactured, the filter-antenna array can be connected to circuitry, such as the circuit layer 106 shown in FIG. 1. For example, referring to FIG. 4, the bottom surface of the filter array 104 can be bonded to a circuit layer such that the integrated circuits on the circuit layer make electrical contact with the respective RF I/O contact pad 204. As the antenna elements 416 are integrated into the filter-antenna array, there is no need to bond the filter-antenna array to an antenna layer. This can reduce the insertion loss of the integrated filter-antenna array.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for forming a radio frequency device, the method comprising:

irradiating, with laser energy, at least one first three-dimensional structure in a first optically transparent dielectric layer;

etching the at least one first three-dimensional structure to form at least one first three-dimensional cavity structure extending at least partially between a first surface and a second surface of the first optically transparent dielectric layer;

depositing metal in the at least one first three-dimensional cavity structure to form a first at least partially closed conductive structure extending at least partially between the first surface and the second surface of the first optically transparent dielectric layer;

depositing a metal layer on the first surface of the first optically transparent dielectric layer without extending the metal layer into the first optically transparent dielectric layer; and forming a first radio frequency input-output (RF I/O) contact and a first ground plane on the first surface of the first optically transparent dielectric layer from the metal layer, the first ground plane spaced apart from, and located about, a perimeter of the first RF I/O contact, wherein the first at least partially closed conductive structure together with the first ground plane at least partially provides a first resonant space in the first optically transparent dielectric layer, the first RF I/O contact not extending into the first optically transparent dielectric layer.

2. The method of claim 1, further comprising:

irradiating, with laser energy, at least one second three-dimensional structure in a second optically transparent dielectric layer;

etching the at least one second three-dimensional structure to form a second three-dimensional cavity structure extending at least partially between a first surface and a second surface of the second optically transparent dielectric layer, and depositing metal in the at least one second three-dimensional cavity structure to form a second at least partially closed conductive structure extending at least partially between the first surface and the second surface of the second optically transparent dielectric layer; and wherein the second at least partially closed conductive structure at least partially provides a second resonant space in the second optically transparent dielectric layer.

3. The method of claim 2, further comprising: forming a second RF I/O contact and a second ground plane on the second surface of the second optically transparent dielectric layer, the second ground plane spaced apart from, and located about, a perimeter of the second RF I/O contact.

4. The method of claim 2, further comprising:

depositing metal on the first surface of the second optically transparent dielectric layer;

depositing metal on the second surface of the first optically transparent dielectric layer; and combining the metal deposited on the second surface of the first optically transparent dielectric layer with the metal deposited on the first surface of the second optically transparent dielectric layer, the first resonant space adjacent to the second resonant space, wherein the metal deposited on the first surface of the second optically transparent dielectric layer and the metal deposited on the second surface of the first optically transparent dielectric layer form a third ground plane between the first resonant space and the second resonant space.

5. The method of claim 4, further comprising: electromagnetically coupling the first resonant space to the second resonant space.

6. The method of claim 5, wherein electromagnetically coupling the first resonant space to the second resonant space includes patterning a first aperture on the metal deposited on the first surface of the second optically transparent dielectric layer and patterning a second aperture on the second surface of the first optically transparent dielectric layer, the first aperture aligned with the second aperture when the metal deposited on the second surface of the first optically transparent dielectric layer is combined with the metal deposited on the first surface of the second optically transparent dielectric layer.

7. A method of making a radio frequency device, the method comprising:

at least partially forming a first resonant space in an optically transparent dielectric material by depositing conductive material in at least one first three-dimensional cavity structure formed by etching at least one first portion of the optically transparent dielectric material after irradiating the at least one first portion with laser energy, the conductive material deposited in the at least one first three-dimensional cavity structure forming a first at least partially closed conductive structure;

depositing a metal layer on a first surface of the optically transparent dielectric material without extending the metal layer into the optically transparent dielectric material;

forming a first ground plane on the first surface of the optically transparent dielectric material from the metal layer, the first ground plane at least partially enclosing an open end of the first at least partially closed conductive structure; and forming a first radio frequency input-output (RF I/O) contact at the first surface from the metal layer, the first ground plane spaced apart from, and located about a perimeter of, at least a portion of the first RF I/O contact, no portion of the first RF I/O contact extending into the optically transparent dielectric material.

8. The method of claim 7, further comprising:

at least partially defining a second resonant space in the optically transparent dielectric material by at least depositing conductive material in at least one second three-dimensional cavity structure formed by etching at least one second portion of the optically transparent dielectric material after irradiating the at least one second portion with laser energy, the conductive material deposited in the at least one second three-dimensional cavity structure forming a second at least partially closed conductive structure, the second resonant space adjacent and electromagnetically coupled to the first resonant space; and forming an intermediate ground plane by depositing conductive material in at least one intermediate cavity formed by etching at least one intermediate portion of the optically transparent dielectric material after irradiating the at least one intermediate portion with laser energy, the intermediate ground plane defining a boundary between the first resonant space and the second resonant space.

9. The method of claim 8, further comprising etching the at least one first portion and the at least one second portion of the optically transparent dielectric material so that the first at least partially closed conductive structure has a structure different from a structure of the second at least partially closed conductive structure.

10. The method of claim 8, further comprising combining a first optically transparent dielectric layer comprising the first resonant space with a second optically transparent dielectric layer comprising the second resonant space, wherein the combined first and second optically transparent dielectric layers constitute the optically transparent dielectric material.

11. The method of claim 8, further comprising:

forming a second ground plane on a second surface, opposite to the first surface, of the optically transparent dielectric material, the second ground plane at least partially enclosing an open end of the second at least partially closed conductive structure; and forming a second RF I/O contact at the second surface, the second ground plane spaced apart from, and located about a perimeter of at least a portion of, the second RF I/O contact.

12. The method of claim 11, further comprising electromagnetically coupling the first resonant space to the second resonant space by providing an aperture, devoid of conductive material, in the intermediate ground plane.

13. The method of claim 8, wherein at least partially defining the first resonant space comprises forming a first M by N array of at least partially defined first resonant spaces in the optically transparent dielectric material; and at least partially defining the second resonant space comprises forming a second M by N array of at least partially defined second resonant spaces in the optically transparent dielectric material, the first M by N array adjacent to the second M by N array, each first resonant space aligned with, and electromagnetically coupled to, a corresponding second resonant space, and each first resonant space separated from the corresponding second resonant space by the intermediate ground plane.

14. The method of claim 13, further comprising electromagnetically coupling each first resonant space to the corresponding second resonant space by providing a corresponding aperture, devoid of conductive material, in the intermediate ground plane separating the first resonant space from the corresponding second resonant space.

15. The method of claim 7, wherein at least partially defining the first resonant space in the optically transparent dielectric material comprises forming a first M by N array of at least partially formed first resonant spaces in the optically transparent dielectric material.

16. The method of claim 7, further comprising inductively coupling the first ground plane to the first RF I/O contact.

17. A method of making a radio frequency device, the method comprising:

at least partially defining an antenna resonant space in an optically transparent dielectric material by depositing conductive material in at least one first three-dimensional cavity structure formed by etching at least one first portion of the optically transparent dielectric material after irradiating the at least one first portion with laser energy;

forming an antenna element on a first surface of the optically transparent dielectric material, the antenna element aligned with a first open end of a first at least partially closed conductive structure formed by depositing the conductive material in the at least one first three-dimensional cavity structure;

at least partially defining a filter resonant space in the optically transparent dielectric material by depositing conductive material in at least one second three-dimensional cavity structure formed by etching at least one second portion of the optically transparent dielectric material after irradiating the at least one second portion with laser energy;

forming a ground plane on a second surface, opposite the first surface, of the optically transparent dielectric material, the ground plane on the second surface at least partially enclosing an open end of a second at least partially closed conductive structure formed by depositing the conductive material in the at least one second three-dimensional cavity structure, the filter resonant space adjacent and electromagnetically coupled to the antenna resonant space, an intermediate ground plane located at least partially between the antenna resonant space and the filter resonant space; and forming a radio frequency input-output (RF I/O) contact at the second surface, the ground plane on the second surface spaced apart from, and located about a perimeter of at least a portion of, the RF I/O contact, the RF I/O contact not extending into the optically transparent dielectric material.

18. The method of claim 17, wherein at least partially defining the antenna resonant space comprises forming an M by N antenna array of antenna resonant spaces in the optically transparent dielectric material, a center of each antenna resonant space separated from a center of another resonant space in a common row or in a common column by a distance based on a wavelength of an operating frequency of the radio device, and at least partially defining the filter resonant space comprises forming an M by N filter array of at least partially formed filter resonant spaces in the optically transparent dielectric material, the M by N antenna array adjacent to the M by N filter array, each antenna resonant space aligned with, and electromagnetically coupled to, a corresponding filter resonant space, and each antenna resonant space separated from the corresponding filter resonant space by the intermediate ground plane.

19. The method of claim 18, further comprising inductively coupling the ground plane on the second surface to the RF I/O contact of each filter resonant space.

* * * * *